United States Patent
Cordasco

(10) Patent No.: US 8,930,818 B2
(45) Date of Patent: Jan. 6, 2015

(54) VISUALIZATION OF WEBSITE ANALYTICS

(75) Inventor: Matthew Cordasco, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 12/750,607

(22) Filed: Mar. 30, 2010

(65) Prior Publication Data

US 2010/0251128 A1    Sep. 30, 2010

Related U.S. Application Data

(60) Provisional application No. 61/165,084, filed on Mar. 31, 2009.

(51) Int. Cl.

| | |
|---|---|
| *G06F 15/177* | (2006.01) |
| *G06F 3/00* | (2006.01) |
| *G06F 11/32* | (2006.01) |
| *G06Q 30/02* | (2012.01) |
| *H04L 29/08* | (2006.01) |
| *G06F 11/34* | (2006.01) |

(52) U.S. Cl.
CPC ........ *G06F 11/328* (2013.01); *G06F 2201/815* (2013.01); *G06F 11/3428* (2013.01); *G06Q 30/02* (2013.01); *H04L 67/36* (2013.01); *G06F 2201/875* (2013.01); *G06F 2201/86* (2013.01); *G06F 2201/87* (2013.01); *G06F 11/3409* (2013.01); *H04L 67/125* (2013.01); *G06F 2201/885* (2013.01); *G06F 2201/80* (2013.01); *G06F 11/3495* (2013.01)
USPC .......................................... 715/736; 715/704

(58) Field of Classification Search
None
See application file for complete search history.

(56) References Cited

U.S. PATENT DOCUMENTS

| | | | |
|---|---|---|---|
| 5,463,547 A | 10/1995 | Markowitz | |
| 5,564,043 A | 10/1996 | Siefert | |

(Continued)

FOREIGN PATENT DOCUMENTS

| | | |
|---|---|---|
| CA | 2656539 | 2/2008 |
| CA | 2696884 | 3/2009 |

(Continued)

OTHER PUBLICATIONS

Reed, Martin. Using Google Analytics Site Overlay. Community Spark. Apr. 13, 2007. Online: <http://www.communityspark.com/using-google-analytics-site-overlay/>.*

(Continued)

*Primary Examiner* — Stephen Alvesteffer

(74) *Attorney, Agent, or Firm* — Stolowitz Ford Cowger LLP

(57) ABSTRACT

A computer-implemented method for visualization of website analytics overlaid upon the source website is described. In one example embodiment, the method can comprise receiving website usage data associated with a customer website, aggregating the website usage data to generate website statistics, processing the website statistics to generate the website analytics, receiving credential data associated with a substantially current user of the customer website, based on the credential data, identifying the substantially current user as a customer associated with the customer website, and selectively communicating the website analytics to the customer website, the website analytics being displayed within a website analytics interface having one or more graphical reports over the website. The interactive graphical reports include reporting elements positioned over website elements corresponding to the reporting elements, which are independent of any variations in the size and shape of the display window or screen. In another example embodiment, the method can comprise pre-configuring and remotely storing display options, and selectively and automatically altering the display of the customer website pages, presenting different versions of those pages to different users based on the pre-configured and remotely stored display options to establish which versions of the page are more effective.

19 Claims, 25 Drawing Sheets

(56) References Cited

U.S. PATENT DOCUMENTS

| | | | |
|---|---|---|---|
| 5,577,254 A | 11/1996 | Gilbert | |
| 5,699,526 A | 12/1997 | Siefert | |
| 5,715,314 A | 2/1998 | Payne | |
| 5,717,879 A | 2/1998 | Moran et al. | |
| 5,721,906 A | 2/1998 | Siefert | |
| 5,751,962 A | 5/1998 | Fanshier et al. | |
| 5,774,552 A | 6/1998 | Grimmer | |
| 5,781,735 A | 7/1998 | Southard | |
| 5,809,250 A | 9/1998 | Kisor | |
| 5,825,880 A | 10/1998 | Sudia | |
| 5,832,458 A | 11/1998 | Jones | |
| 5,832,496 A | 11/1998 | Anand et al. | |
| 5,845,124 A | 12/1998 | Berman | |
| 5,848,396 A | 12/1998 | Gerace | |
| 5,848,412 A | 12/1998 | Rowland | |
| 5,857,188 A | 1/1999 | Douglas | |
| 5,867,578 A | 2/1999 | Brickell | |
| 5,870,559 A * | 2/1999 | Leshem et al. | 709/224 |
| 5,894,516 A | 4/1999 | Brandenburg | |
| 5,903,652 A | 5/1999 | Mital | |
| 5,905,868 A | 5/1999 | Baghai et al. | |
| 5,909,492 A | 6/1999 | Payne | |
| 5,930,786 A | 7/1999 | Carino, Jr. et al. | |
| 5,933,601 A | 8/1999 | Fanshier et al. | |
| 5,941,957 A | 8/1999 | Ingrassia, Jr. et al. | |
| 5,951,643 A | 9/1999 | Shelton et al. | |
| 5,951,652 A | 9/1999 | Ingrassia, Jr. et al. | |
| 5,954,798 A | 9/1999 | Shelton et al. | |
| 5,991,791 A | 11/1999 | Siefert | |
| 6,006,228 A | 12/1999 | McCollum et al. | |
| 6,026,403 A | 2/2000 | Siefert | |
| 6,035,332 A | 3/2000 | Ingrassia, Jr. et al. | |
| 6,085,223 A | 7/2000 | Carino, Jr. et al. | |
| 6,151,584 A | 11/2000 | Papierniak et al. | |
| 6,151,601 A | 11/2000 | Papierniak et al. | |
| 6,169,997 B1 | 1/2001 | Papierniak et al. | |
| 6,182,097 B1 * | 1/2001 | Hansen et al. | 715/234 |
| 6,253,203 B1 | 6/2001 | O'Flaherty et al. | |
| 6,286,030 B1 | 9/2001 | Wenig | |
| 6,286,046 B1 | 9/2001 | Bryant | |
| 6,286,098 B1 | 9/2001 | Wenig | |
| 6,295,550 B1 | 9/2001 | Choung et al. | |
| 6,317,794 B1 | 11/2001 | Papierniak et al. | |
| 6,334,110 B1 | 12/2001 | Walter et al. | |
| 6,397,256 B1 | 5/2002 | Chan | |
| 6,418,439 B1 | 7/2002 | Papierniak et al. | |
| 6,480,855 B1 | 11/2002 | Siefert | |
| 6,489,980 B1 | 12/2002 | Scott et al. | |
| 6,502,086 B2 | 12/2002 | Pratt | |
| 6,519,600 B1 | 2/2003 | Siefert | |
| 6,651,072 B1 | 11/2003 | Carino, Jr. et al. | |
| 6,658,453 B1 | 12/2003 | Dattatri | |
| 6,671,687 B1 | 12/2003 | Pederson et al. | |
| 6,714,931 B1 | 3/2004 | Papierniak et al. | |
| 6,766,333 B1 | 7/2004 | Wu et al. | |
| 6,850,975 B1 | 2/2005 | Daneels et al. | |
| 6,877,007 B1 | 4/2005 | Hentzel et al. | |
| 7,076,495 B2 | 7/2006 | Dutta et al. | |
| 7,260,837 B2 | 8/2007 | Abraham et al. | |
| 7,272,639 B1 | 9/2007 | Levergood | |
| 7,278,105 B1 * | 10/2007 | Kitts | 715/736 |
| 7,293,281 B1 | 11/2007 | Moran et al. | |
| 7,490,319 B2 | 2/2009 | Blackwell et al. | |
| 7,580,996 B1 | 8/2009 | Allan | |
| RE41,903 E | 10/2010 | Wenig | |
| 8,042,055 B2 | 10/2011 | Wenig | |
| 8,127,000 B2 | 2/2012 | Wenig | |
| 8,219,531 B2 * | 7/2012 | Eagan et al. | 707/667 |
| 8,335,848 B2 | 12/2012 | Wenig | |
| 8,381,088 B2 | 2/2013 | Kikin-Gil et al. | |
| 8,533,532 B2 | 9/2013 | Wenig | |
| 8,583,772 B2 | 11/2013 | Wenig | |
| 2002/0049840 A1 | 4/2002 | Squire | |
| 2002/0056091 A1 | 5/2002 | Bala | |
| 2002/0065912 A1 | 5/2002 | Catchpole et al. | |
| 2002/0070953 A1 * | 6/2002 | Barg et al. | 345/700 |
| 2002/0083183 A1 | 6/2002 | Pujare et al. | |
| 2002/0112035 A1 | 8/2002 | Carey et al. | |
| 2002/0165954 A1 | 11/2002 | Eshghi et al. | |
| 2003/0005000 A1 | 1/2003 | Landsman et al. | |
| 2003/0023715 A1 * | 1/2003 | Reiner et al. | 709/224 |
| 2003/0128233 A1 * | 7/2003 | Kasriel | 345/738 |
| 2003/0145071 A1 | 7/2003 | Straut | |
| 2003/0154289 A1 | 8/2003 | Williamson et al. | |
| 2004/0019675 A1 | 1/2004 | Hebeler | |
| 2004/0059809 A1 | 3/2004 | Benedikt et al. | |
| 2004/0059997 A1 | 3/2004 | Allen et al. | |
| 2004/0078464 A1 | 4/2004 | Rajan et al. | |
| 2004/0100507 A1 | 5/2004 | Hayner et al. | |
| 2004/0158574 A1 * | 8/2004 | Tom et al. | 707/102 |
| 2005/0021713 A1 | 1/2005 | Dugan et al. | |
| 2005/0030966 A1 | 2/2005 | Cai et al. | |
| 2005/0033803 A1 | 2/2005 | Vleet et al. | |
| 2005/0066037 A1 | 3/2005 | Song et al. | |
| 2005/0071464 A1 | 3/2005 | Kuwata et al. | |
| 2005/0086606 A1 | 4/2005 | Blennerhassett et al. | |
| 2005/0188080 A1 | 8/2005 | Motsinger et al. | |
| 2005/0246651 A1 | 11/2005 | Krzanowski | |
| 2005/0278565 A1 | 12/2005 | Frattura et al. | |
| 2006/0048214 A1 | 3/2006 | Pennington et al. | |
| 2006/0075088 A1 | 4/2006 | Guo | |
| 2006/0117055 A1 | 6/2006 | Doyle | |
| 2006/0123340 A1 * | 6/2006 | Bailey et al. | 715/700 |
| 2006/0162071 A1 | 7/2006 | Dixon et al. | |
| 2006/0248452 A1 * | 11/2006 | Lambert et al. | 715/513 |
| 2007/0106692 A1 | 5/2007 | Klein | |
| 2007/0226314 A1 | 9/2007 | Eick | |
| 2007/0245249 A1 | 10/2007 | Weisberg | |
| 2007/0255754 A1 | 11/2007 | Gheel | |
| 2008/0005661 A1 | 1/2008 | Yao et al. | |
| 2008/0005793 A1 | 1/2008 | Wenig et al. | |
| 2008/0034036 A1 | 2/2008 | Takeshima et al. | |
| 2008/0046562 A1 | 2/2008 | Butler | |
| 2008/0052377 A1 | 2/2008 | Light | |
| 2008/0127217 A1 | 5/2008 | Wang | |
| 2008/0184129 A1 * | 7/2008 | Cancel et al. | 715/741 |
| 2008/0216094 A1 | 9/2008 | Anderson | |
| 2008/0294974 A1 * | 11/2008 | Nurmi et al. | 715/204 |
| 2009/0013347 A1 | 1/2009 | Ahanger | |
| 2009/0019133 A1 | 1/2009 | Brimley | |
| 2009/0024930 A1 | 1/2009 | Kim | |
| 2009/0037517 A1 | 2/2009 | Frei | |
| 2009/0037914 A1 * | 2/2009 | Chagoly et al. | 718/101 |
| 2009/0063968 A1 | 3/2009 | Wenig | |
| 2009/0070869 A1 | 3/2009 | Fan et al. | |
| 2009/0083714 A1 | 3/2009 | Kiciman et al. | |
| 2009/0138554 A1 | 5/2009 | Longoboard et al. | |
| 2009/0228474 A1 * | 9/2009 | Chiu et al. | 707/5 |
| 2009/0247193 A1 | 10/2009 | Kalavade | |
| 2009/0254529 A1 | 10/2009 | Goldentouch | |
| 2010/0042573 A1 | 2/2010 | Wenig | |
| 2010/0058285 A1 | 3/2010 | Meijer | |
| 2010/0070929 A1 * | 3/2010 | Behl et al. | 715/854 |
| 2010/0146380 A1 | 6/2010 | Rousso | |
| 2010/0169792 A1 * | 7/2010 | Ascar et al. | 715/744 |
| 2010/0211638 A1 * | 8/2010 | Rougier | 709/205 |
| 2010/0251128 A1 | 9/2010 | Cordasco | |
| 2010/0287229 A1 | 11/2010 | Hauser | |
| 2010/0318507 A1 | 12/2010 | Grant et al. | |
| 2011/0029665 A1 | 2/2011 | Wenig et al. | |
| 2011/0320880 A1 | 12/2011 | Wenig | |
| 2012/0084437 A1 | 4/2012 | Wenig | |
| 2012/0102101 A1 | 4/2012 | Wenig | |
| 2012/0151329 A1 | 6/2012 | Cordasco | |
| 2012/0173966 A1 | 7/2012 | Wenig et al. | |
| 2013/0091417 A1 | 4/2013 | Cordasco | |
| 2013/0339428 A1 | 12/2013 | Wenig | |
| 2014/0108911 A1 | 4/2014 | Damale | |
| 2014/0115712 A1 | 4/2014 | Powell | |
| 2014/0137052 A1 | 5/2014 | Hernandez | |

(56) References Cited

U.S. PATENT DOCUMENTS

FOREIGN PATENT DOCUMENTS

| EP | 0326283 | 8/1989 |
|---|---|---|
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

Stolowitz Ford Cowger LLP, Listing of Related Cases May 3, 2012.
Written Opinion of the International Searching Authority; PCT/US11/35410; Date of mailing Dec. 14, 2011.
International Search Report for PCT/US11/35410; Date of mailing Dec. 14, 2011.
Smith et al., "Automated Protocol Analysis," Human Computer Interaction, 8:101-145, 1993.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999, pp. 337-355.
International Search Report for PCT/US08/65582; Date of Mailing Sep. 11, 2008.
International Search Report for PCT/US2007/071096; Date of mailing May 13, 2008.
Written Opinion of the International Searching Authority for PCT/US08/65582; Mailing date Sep. 11, 2008.
Written Opinion of the International Searching Authority for PCT/US07/71096; Mailing date May 13, 2008.
PCT Search Report for PCT/US2011/033813; Mailing Date Jul. 28, 2011.
Written Opinion of the International Searching Authority for PCT/US2011/033813; Mailing Date Jul. 28, 2011.
Stolowitz Ford Cowger Listing of Related Cases Mar. 15, 2012.
International Search Report for PCT/US09/04654; Date of mailing Oct. 2, 2009.
Written Opinion of the International Searching Authority; PCT/US09/04654; Date of mailing Oct. 2, 2009.
Holloway, et al., "Cryptographic Initialization Test", IBM Technical Dsiclsoure Bulletin, pp. 195-198, Feb. 1991.
Peter Brusilovsky et al., "Adaptive and Intelligent Web-based Educational Systems," International Journal of Artificial Intelligence in Education, Apr. 1, 2003, pp. 159-172, XP55039152, The Netherlands Retrieved from the Internet: URL: http://www.sis.pitt.edu/~peterb/papers/AIWBES.pdf [retrieved on Sep. 25, 2012] p. 160-161.
Atterer R et al. : "Knowing the User's Every Move—User Activity Tracking for Website Usability Evaluation and Implicit Interaction," WWW '06 Proceedings of the 15th World Wide Web, ACM, New York, NY, USA, May 22, 2006, pp. 203-212, XP002519605, DOI: 10.1145/1135777.1135811 ISBN 978-1-5959-323-2.
Bishop, Matt et al., "A Model of Security Monitoring", Department of Mathematics and Computer Science, Dartmouth College, pp. 46-52. Dec. 1989.
Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.
Lubarsky, How to Delete Cookie Using Javascript, Aug. 19, 2007, http:web.archive.org/web/20070819123555/http://blogs.x2line.com/al/articles/316.aspx.
Stolowitz Ford Cowger LLP; Listing of Related Cases; Aug. 27, 2012.
International Search Report for PCT/US12/25971; Date of mailing May 31, 2012.
Written Opinion of the International Searching Authority for PCT/US12/25971; Date of mailing May 31, 2012.
International Search Report for PCT/US2013/023636; Date of Mailing Aug. 13, 2013.
Written Opinion of the International Searching Authority for PCT/US2013/023636; Date of Mailing Aug. 13, 2013.
Stolowitz Ford Cowger LLP, Listing of Related Cases, May 14, 2013.
Rubio, An Introduction to JSON, Feb. 28, 2007, http://www.oracle.com/technetwork/articles/entarch/introduction-json-097942.html.
Teare, An Introduction to Ajax, Aug. 2005, http://www.oracle.com/technetwork/articles/entarch/ajax-introduction-096831.html.
Stolowitz Ford Cowger LLP; Listing of Related Cases; Dec. 19, 2013.
Summons to attend oral proceedings pursuant to Rule 115(1) in EP App. No. 07840244.3; Dated Dec. 12, 2013.
Communication from the EP Patent Office pursuant to Article 94(3) EPC in EP Application No. 09806979.2; dated Jan. 6, 2014.

* cited by examiner

VISUALIZATION OF WEBSITE ANALYTICS

RELATED APPLICATIONS

This application claims the benefit of the filing date of Provisional Application 61/165,084 filed on Mar. 31, 2009, which is incorporated herein by reference.

FIELD

This application relates generally to website analytics and, more specifically, to visualization of website analytics.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Website analytics is generally used for measurement, collection, analysis, and reporting of website usage data as well as website visitor behaviors for purposes of understanding and optimizing website usage. Website analytics can measure and analyze performance of a website in commercial as well as noncommercial contexts. In a commercial context, the website owner may want to know which pages of the website encourage people to make a purchase. The data collected during performance measurements of the website can be used to improve website effectiveness.

In website analytics, various approaches can be taken to collect and process data related to website performance. According to one approach, log files in which the web server records its transactions can be read and analyzed. In another approach, pages of the website can be tagged with a snippet of computer code (e.g., JavaScript or an image) to notify a third-party server when the pages are rendered by the web browser. The snippet can also pass certain information about the webpage and the visitor to the third-party server. This information can then be processed and statistics generated. The statistics can then be used to provide reports, which can include website performance information, number of page views, time of the day, and click data (e.g., location on the page, object clicked on, and other custom metrics). In order to uniquely identify a user during multiple visits, the user can be assigned a cookie.

Typical website analytics provider requires a customer to log into its website to view the website analytics interface. This approach provides the customer with a third person perspective, where the third party website is displaying metrics about the original client's site. This third person perspective can make it difficult to understand specific data or usage patterns because they are not presented in the context of the website.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
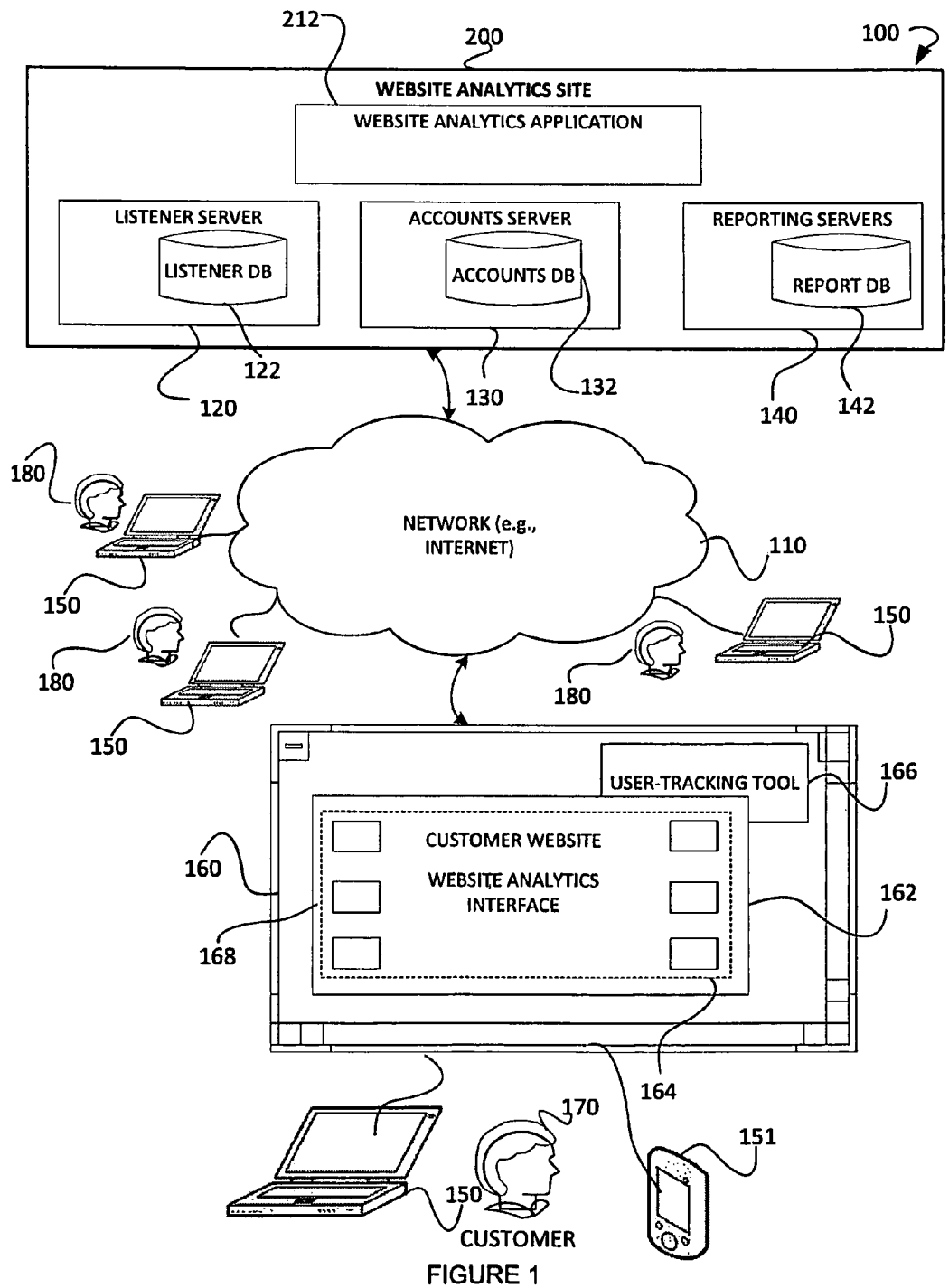
FIG. 1 is a block diagram illustrating architecture within which the website analytics visualization is implemented, in accordance with an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In an example embodiment, a method for visualization of website analytics is provided. A "code snippet" (e.g., JavaScript) can be embedded into the source code of one or more web pages of a customer website. For the purposes of this description, a customer website is any third party website utilizing website analytics technology described herein. The code snippet can be provided on a website analytics site or generated automatically by such a site. For the purposes of this description, a website analytics site is a website that enables customers to signup for and manage their web analytics accounts. The website analytics site can also display marketing and support information for the website analytics technology.

The code snippet embedded into the customer website can send data to the remote website analytics site when a browser renders a webpage at the customer website. Thereafter, another more robust "bootstrap" script can be loaded. The bootstrap script can then send data to the website analytics site. The bootstrap script can detect, collect, and pass data related to the customer website and its users to the website analytics site.

The bootstrap script can also load a "library" script from the website analytics site. This library script can provide broader functionality than the bootstrap script. For example, the library script can provide more robust methods to collect page data, traffic data, browser data, usage data, click data, event data, and time-based user actions, and pass this data back to the website analytics site for storage and processing. The website analytics site can aggregate the received data with the historical data received from the customer website and generate statistics related to the customer website, as well as derive information about the location on the page of any such events relative to the underlying elements of that page, independently of the size and layout of any specific display screen.

Based on the credentials provided by a customer and verified by the website analytics site, the library script can dynamically embed into the customer website a web analytics report. The web analytics report is provided by a web analytics application residing at the website analytics site and can include, for example, a listener server to listen to the function calls created by the library script and can include reporting servers to report the website analytics reports. The web analytics application can also include account management functionalities.

The web analytics application can enable the display of the web analytics provided by the website analytics site as one or more interactive graphical reports overlaying the customer website. The web analytics application can be implemented using, for example, Rich Internet Application (RIA) based on Flash, Silverlight, Java or DHTML, also known as a Remote Rich Internet Application (RRIA). It will be understood that other technologies can be utilized to provide the functionality and remote rendering of the web analytics application.

Thus, the website analytics can be delivered as a RIA and/or RRIA and presented in the form of one or more of the interactive graphical reports right at the customer website. The interactive graphical reports are generated as overlays placed over the customer website and can be transparent, semitransparent and/or opaque renderings presented in the context of the customer website. The web analytics application displays these overlays by management of the web page script of the underlying pages of the customer website, and by controlling and modifying the rendering and display of those pages. Thus, the positioning of the various elements in the interactive graphical reports can be exactly linked to the positioning of the underlying page elements of the customer website, which are relevant to the website analytics being displayed, independently of the size or layout of that page on any individual user's computer screen.

As the web analytics application can manage the rendering and display of the customer site web pages, it can perform a number of automatic actions based on predefined criteria when such pages are displayed. For example, dynamic A/B testing, uptime monitoring, email management, and others. In one such example it can perform dynamic A/B testing, by substituting elements on any page of the customer website according to preconfigured settings, which can be defined by an analytics application user via the web analytics application, and stored remotely at the website analytics site. Such substitutions can be performed by the web analytics application, for example, when a request to display a customer website page is detected, by temporarily modifying the web script of that page immediately prior to displaying it, and by replacing one or more elements of the page with one of several other page elements typically of a similar size and function, but with different text, colors, shapes, graphical images or other display characteristics. Such substitutions can be performed, for example, either at fixed times, or for a fixed period, or according to some visitor grouping criteria, or simply randomly for each visitor, as defined in the preconfigured stored settings.

With the focal point still being the customer website, the interactive graphical reports can include thumbnail page browsing functionality in which each thumbnail can display information related to the corresponding webpage and permit navigating of the corresponding page. The thumbnails of the web pages can be arranged to show, but are not limited to, website visitor usage patterns, click paths, entry and exit points, treeview structures of the website, goal selection, reverse goal selection, and general navigation. The thumbnails can also be arranged to show the most frequent path or paths taken by the users while browsing the customer website. Such paths can be depicted within the context of a thumbnail grid or linearly.

The reports may also include one or more of collective multi-page heat maps, heat trails, top links, or other, similar, location-based interactive graphical reports. For example, the heat maps can use different colors to illustrate and contrast frequency of usage (based, for example, on mouse movements, mouse hovers, mouse clicks, and other similar events) across multiple web pages of the customer website and website partner sites with respect to each other. The heat maps, heat trails, top links and other such reports can also be used to indicate click density within a given webpage and/or relative time spent interacting with a given area of the web page. Single webpage heat maps, heat trails and top links can also be generated to illustrate the most popular areas within each single webpage.

FIG. 1 illustrates an example environment 100, within which visualization of website analytics can be implemented. As shown in FIG. 1, the example environment 100 can include a website analytics site 200. The website analytics site 200 can provide its services as Software as a Service (SAAS) and does not require any permanent installation on client computer systems. The website analytics site 200 can include various servers, such as a listener server 120, an accounts server 130, reporting servers 140. The website analytics may also include a website analytics application 212. The listener server 120 can be configurable to receive communications from a customer website 168 illustrated in FIG. 1. The listener server 120 can include a listener database (DB) 122 where the communications received from various websites are stored as raw data. A reporting daemon process can pull the raw data from the listener DB 122. It then can process the raw data and store the processed data in a reporting DB 142.

The listener server 120 can also be utilized to receive customer credentials when a customer 170 illustrated in FIG. 1 logs into the customer website 168. In some example embodiments, customer credentials can be based on the Internet Protocol (IP) address of the customer computer and/or the information provided by a cookie stored on the customer computer. Thereafter, the listener server 120 can validate the customer credentials with the accounts server 130. The accounts server 130 can, in turn, query accounts DB 132 to validate the customer credentials. Based on successful validation, the listener server 120 can redirect the communication to one of the reporting servers 140, which services customer's account.

The reporting servers 140 may pull the data corresponding to the customer's account from the reporting DB 142 and present this data as one or more interactive graphical reports as an overlay over the customer website 168. The data can be presented with menus, charts, data grids, statistics, overlays, visualizers, and thumbnails. Various technologies (e.g., Adobe Flash, Microsoft Silverlight, Sun Java, and DHTML) can be used for graphical presentation of the website analytics over the customer website 168. A player (not shown), dynamically embedded in the customer website 168, can run a file such as, for example, Shockwave Flash (SWF) generated by the website analytics site 200 based on the customer account data and sent to the customer website 168. The environment 100 can also include a computer network 110. The network 110, as shown in FIG. 1, can communicatively couple various depicted modules. The network 110 is a network of data processing nodes interconnected for the purpose of data communication.

The example environment 100 can also include one or more computers 150 utilized by the customer 170 and users 180 to view and interact with the customer website 168. It will be understood that any other device having a user interface 160 can be utilized to view and interact with the customer website 168. For example, a mobile device 151 (e.g., a mobile telephone, a personal digital assistant) can be used by the customer 170 and the users 180 to launch the user interface 160 through which the website 168 can be accessed. The user interface 160 can be rendered with a browser (e.g., Internet Explorer, Firefox, Safari, Mozilla, Chrome, and Opera) or directly on the computer 150 and/or the computer device 151 using a native application (e.g., Adobe Integrated Runtime). The user interface 160 can include interactive graphical reports 162 created by the website analytics site 200 and run by the website analytics application 212 remotely. The website analytics interface 162 can be interactive and overlay the customer website 168 (e.g., an HTML page). The website analytics interface 162 can include top, bottom, left, and right docking areas, which are semi-transparent overlays with the customer website 168 being visible beneath these overlays. The website analytics interface 162 can also include menus (docked and/or floating), which are opaque. The top and bottom docking areas can be flush top and flush bottom. The left and right docking areas can be flush left and flush right. The customer 170 can minimize the website analytics interface 162 while being able to continue using the customer website 168.

The user interface 160 can also include a user-tracking tool 166. The user-tracking tool 166 can utilize a code snippet embedded into the customer website 168 to detect initialization of a particular web page of the customer website 168. The code snippet can be placed for each webpage that the customer 170 would like to track. This code snippet can interact with the webpage Data Object Model (DOM), add elements to the source code of the webpage, initialize the webpage, and retrieve a bootstrap script from the website analytics site 200. The bootstrap script, in turn, can load a library script, which provides broader functionality. Both the bootstrap script and library script can send usage data to the website analytics site 200 and/or load the website analytics interface 162 enabled remotely by the website analytics application 212.

The listener server 120 is configurable to filter the incoming data by consulting with the accounts DB 132 to ensure that the data originates from the customer website 168. The information provided by the accounts DB 132 can also ensure that the periodic traffic quotas for the customer 170 are not exceeded. As already mentioned above, the incoming data received by the listener server 120 is stored in the listener DB 122 for later processing as well as for real-time reporting. The website analytics site 200 is described by way of example with reference to FIG. 2.

Figure 2:
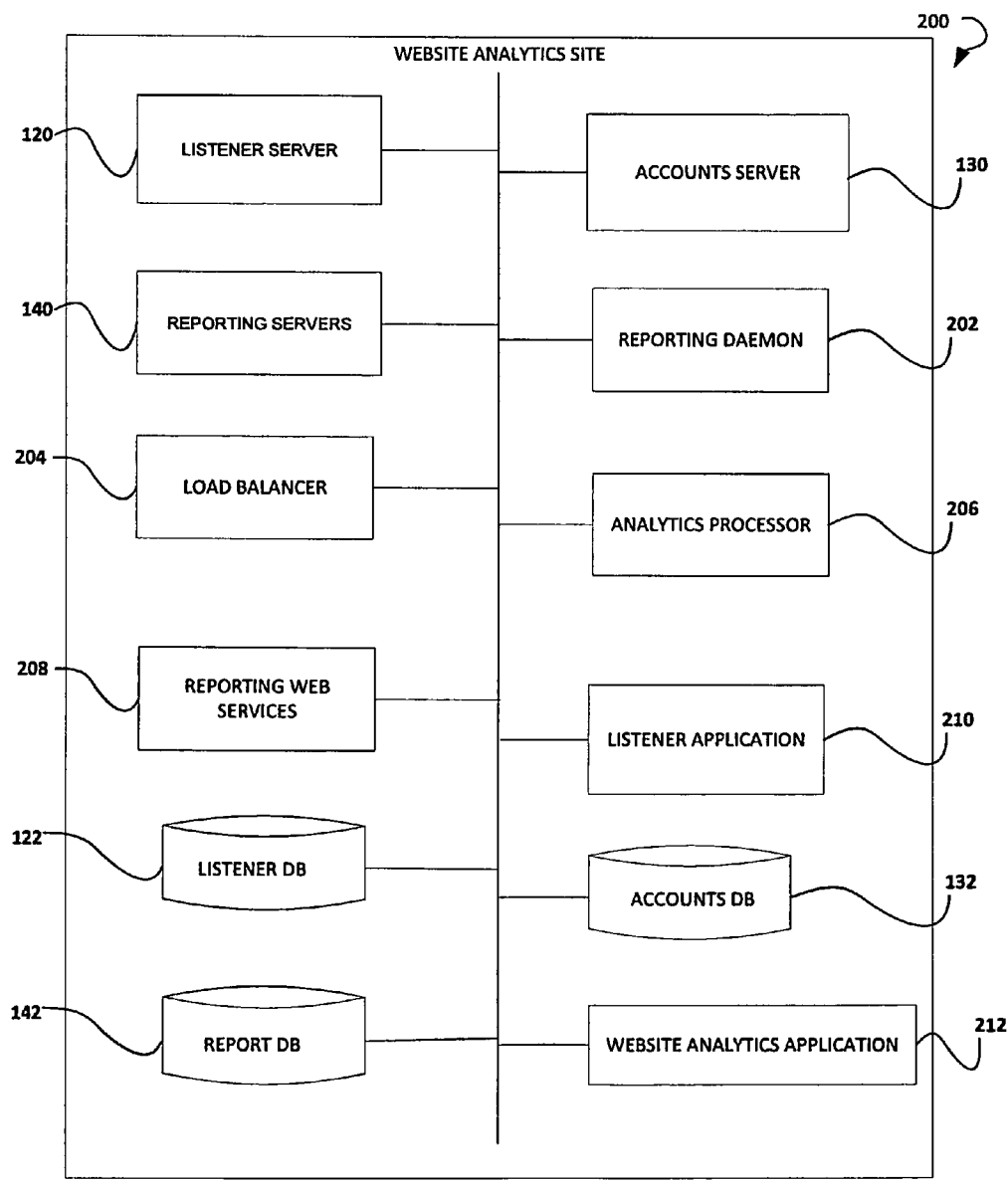
FIG. 2 is a block diagram illustrating a website analytics site, in accordance with an example embodiment.

FIG. 2 is a block diagram illustrating a website analytics site 200, in accordance with an example embodiment. In one example embodiment, the website analytics site 200 may include the listener server 120, the accounts server 130, the reporting servers 140, the reporting daemon 202, the listener DB 122, the accounts DB 132, the report DB 142, and the website analytics application 212. The foregoing modules were described above with reference to FIG. 1.

The website analytics site 200 can also include a load balancer 204, an analytics processor 206, reporting web services 208, and a listener application 210. The load balancer 204 can be used to spread work between two or more computers, network links, CPUs, hard drives, or other resources, in order to get optimal resource utilization, maximize throughput, and minimize response time. The analytics processor 206 can include the logic underlying analysis of the website statistics and generation of website analytics. The reporting web services 208 can be utilized to access the application programming interfaces (API) of the website analytics site 200 over the network 110 in order to be executed on the customer website 168. The reporting services 208 can also by utilized by the website analytics application 212 to access customer data. Based on the customer data provided by the reporting services 208, the website analytics application 212 can enable display of the website analytics report 212 on the customer website 168. The listener application 210 can be utilized by the listener server 120 to accept and filter the incoming events. The modules of the website analytics site 200 can be utilized to perform various operations with reference to FIG. 3.

Figure 3:
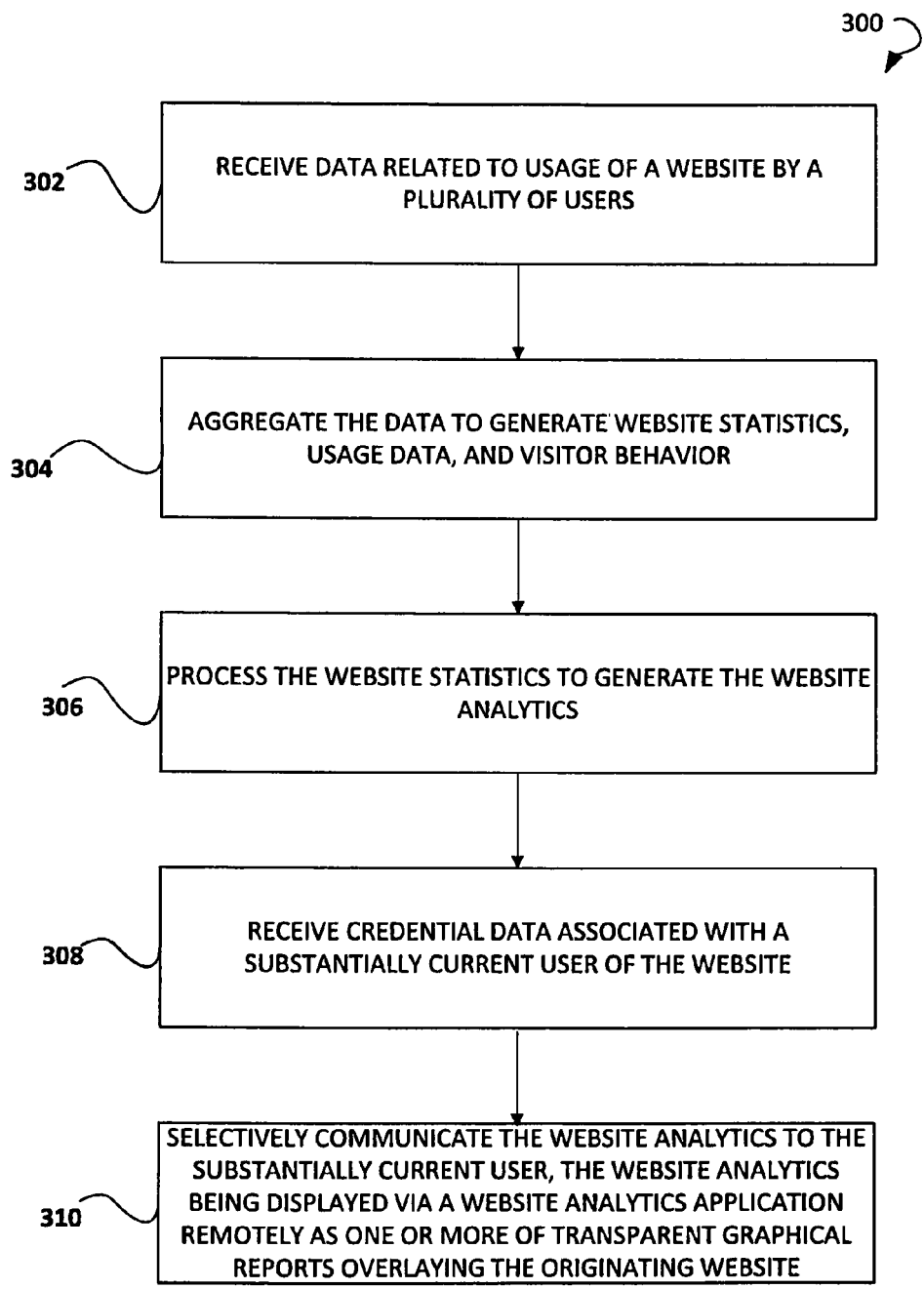
FIG. 3 is a process flow diagram illustrating a method for the website analytics visualization, in accordance with an example embodiment.

FIG. 3 is a process flow diagram illustrating a method for website analytics visualization 300, in accordance with an example embodiment. The method 300 can be performed by processing logic that can comprise hardware (e.g., dedicated logic, programmable logic, and microcode), software (such as software run on a general-purpose computer system or a dedicated machine), or a combination of both. In one example embodiment, the processing logic resides at the website analytics site 200, illustrated in FIG. 2. The method 300 can be performed by the various modules discussed above with reference to FIG. 2. Each of these modules can comprise processing logic.

As shown in FIG. 3, the method 300 can commence at operation 302 with the listener server 120 receiving data related to usage of the customer website 168 by the users 180 from the user-tracking tool 166. As already mentioned above, the tracking tool 166 may utilize a code snippet that the customer 170 adds onto web pages of the customer website 168. This code snippet acts as a beacon, collecting visitors' data, events and behavior, and sends them back to the listener server 120 of the website analytics site 200 for processing. In addition to broadcasting the data to the listening server 120, the snippet can set cookies on each user's computer to track individual "sessions" and visitor "uniqueness". This can be used to determine whether the visitor has been to the site before, the timestamp of the current visit, and the referrer site or a campaign the visitor came from (e.g., search engine, keywords, banner, email). The code snippet can be automatically run every time the page is loaded.

The data collected by the code snippet can include the referring domain, the referring URL, browser agent information, the originating IP address, mouse events (e.g., click, hover, double click, right click, onClick, on MouseOver, on Focus, on Blur), keyboard events (e.g., key down, key up, character entered), event data, event object data, click location, event time and duration, link events, link object names and values, link destinations, browser size, visitors' screen sizes, specific form data including values, or the price of the goods they purchased, interactions within media files, partial form completions, and form submitting.

The collection of this data by the code snippet can also permit the web analytics application to derive location information for events that are connected to the location of the underlying web page elements, not simply the physical position on the page, which may vary according to the screen size, screen resolution and other factors. This permits binding of event locations to those web page elements, and so ensures analytics information on an overlay can always be displayed correctly, independently of any specific screen display.

The code snippet can also manage the process of assigning cookies to users. Other data collected by the code snippet can include page views, which occurrence of the code snippet is being run, visit/session, which is a series of requests from the same uniquely identified client with a set timeout, (e.g., 30 minutes). The snippet can also be used to collect data including first visit and/or first session which are a visit from a user ("uniqueness") who has not made any previous visits. Identification can be made to the user's computer, via cookie and/or IP.

Further collected data can include bounce rate which is the percentage of visits where the visitor enters and exits at the same page without visiting any other pages on the site in between. Recorded data may additionally include visibility time, which is time a single page (e.g., a blog and an ad banner) is viewed, session duration, which is an average amount of time that visitors spend on the site each time they visit, a page view duration/time on page, which is an average amount of time that visitors spend on each page of the site, a page depth/page views per session, which is the average number of page views a visitor consumes before ending their session, frequency per unique ID, which measures how often visitors come to the customer website 168, a click path which is the sequence of hyperlinks one or more website users 180 follows on a given site, the first page being the page that was visited first, and the page from which the customer website 168 was exited, IP address, country code, screen resolution, browser and browser version, window size, JavaScript support, and regional settings.

In operation 304, the analytics processor 206 can aggregate the data received by the listener server 120 and generate website statistics. At operation 306, the reporting servers 140 can process the website statistics to generate the website analytics. In some example embodiments, the data processing can be performed periodically (e.g., hourly). When the customer 170 logs into the customer website 168, the listener server 120 can receive credential data associated with the customer 170 of the customer website 168 at operation 308.

At operation 310, the reporting servers 140 can report the website analytics, created by the analytics processor 206 to the website analytics application 212. The website analytics application 212 presents the website analytics remotely as the website analytics interface 162 overlaying the customer website 168. Thus, the website analytics are delivered to the customer 170 directly over the customer website 168. This approach results in the customer website 168 being the focal point/frame of reference, which is the First Person perspective.

Figure 4:
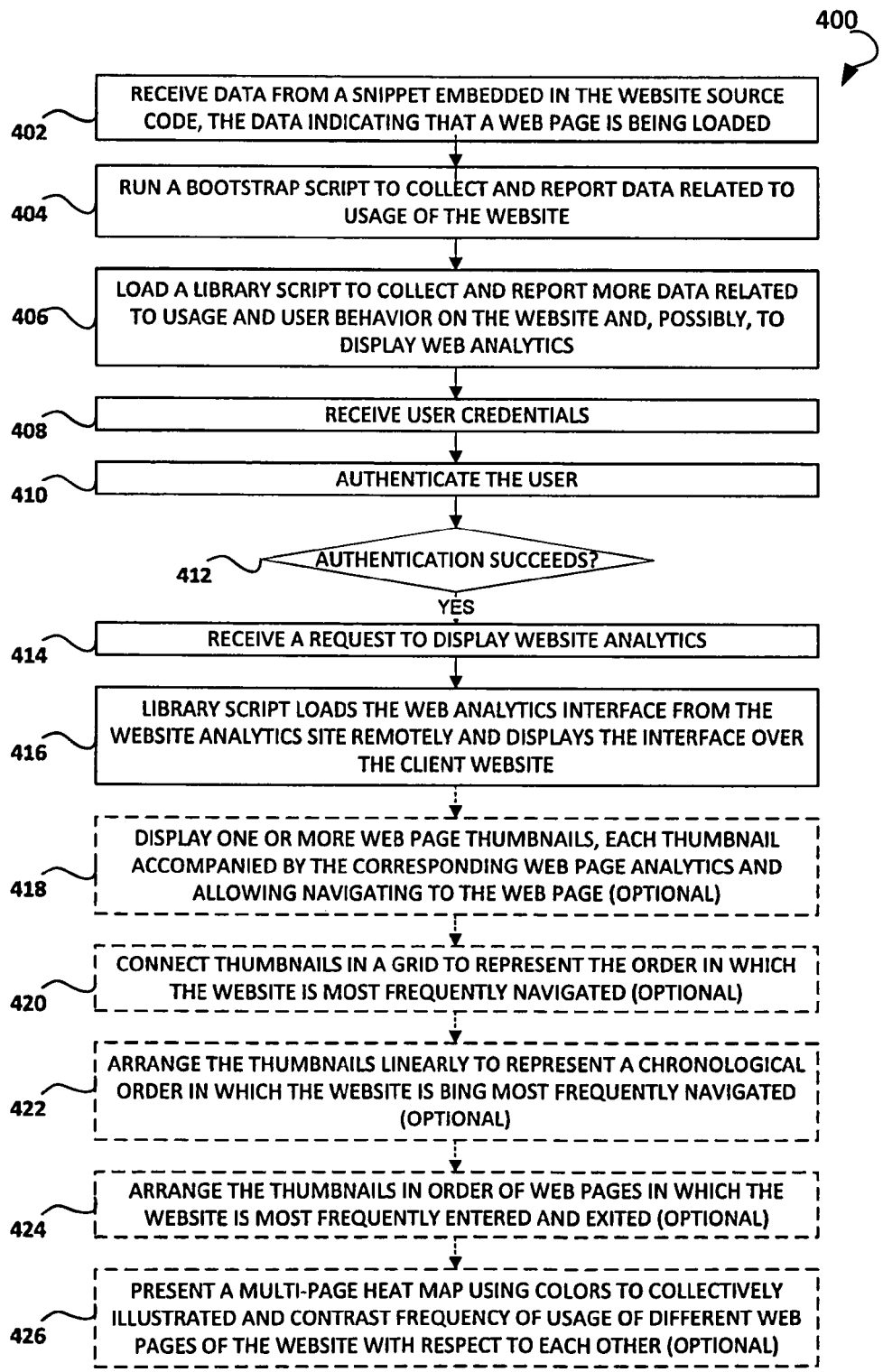
FIG. 4 is a process flow diagram illustrating a further method for website analytics visualization, in accordance with an example embodiment.

FIG. 4 is a flow diagram illustrating a further method for website analytics visualization 400, in accordance with an example embodiment. The method 400 can be performed by processing logic that can comprise hardware (e.g., dedicated logic, programmable logic, microcode, etc.), software (such as software run on a general-purpose computer system or a dedicated machine), or a combination of both. In one example embodiment, the processing logic resides at the website analytics site 200, illustrated in FIG. 2. The method 400 can be performed by the various modules discussed above with reference to FIG. 2. Each of these modules may include processing logic.

As shown in FIG. 4, the method 400 can commence at operation 402 with the listener server 120 receiving data from a snippet embedded in the website source code. The data can indicate that a web page is being loaded by the browser.

At operation 404, the website analytics site 200 can run a bootstrap script through the snippet to collect and report data related to the usage of the customer website 168. In some example embodiments, the script delivered to the client's browser can be brought in two stages. The first stage can include pulling the initial bootstrap script, and the second stage, at operation 406, can include pulling a more robust library script. At operation 408, the listener server 120 can receive user credentials. The accounts server 130 can then authenticate the user credential at operation 410.

At operation 412, it can be determined whether the user is a valid customer associated with the website 168. If the accounts server 130 cannot authenticate the user as a valid customer associated with the website 168, the library script will not load the website analytics interface 162 and the process may be aborted. If, on the other hand, the user is authenticated as the customer 170, the library script is enabled to load the website analytics interface 162 upon request by the customer 170. Thus, at operation 414, the customer 170 can request that the library script load the website analytics interface 162. In response, at operation 416, the website analytics application 212 can remotely provide data to be loaded on the website analytics interface 162.

The website analytics interface 162 can include interactive graphical reports, which are displayed over the customer website 168 at an optional operation 418. The interactive graphical reports may include one or more thumbnails, each thumbnail accompanied by the corresponding website analytics and allowing navigating to the corresponding web page. To create the thumbnails the customer website 168 can be crawled. The crawling of the customer website 168 can also allow summarizing and reporting website data to the customer 170. For example, the customer 170 can be notified that some of the web pages do not have snippets. The thumbnails can be utilized to display and navigate around the website usage data. With the focal point being the customer website 168, the thumbnail images of other web pages can display information and simultaneously allow for navigation to that page.

At optional operation 420, the thumbnails may be displayed in a grid with connections representing the order in which the customer website 168 is most frequently navigated. For example, in a 5-by-5 grid of the webpage thumbnails, the click path can include numbers associated with each click. At optional operation 422, the thumbnails can be arranged linearly to represent the chronological order in which the website is most frequently navigated. This arrangement is similar to the grid arrangement, but the thumbnails are listed horizontally and in chronological order according to when they were clicked. At optional operation 424, the thumbnails can be arranged in order in which the website is most frequently entered and exited. In this arrangement, vertical columns of thumbnails visually depict the top entry and exit pages.

At optional operation 426, a multi-page heat map can be presented using different colors to collectively illustrate and contrast usage frequency of different web pages of the website with respect to each other. For example, the heat map can highlight with red color the place on the customer website 168 with the most number of clicks. The multi-page heat map displays the web pages collectively with the most clicked areas of the entire site, within a visible graph.

Figure 5:
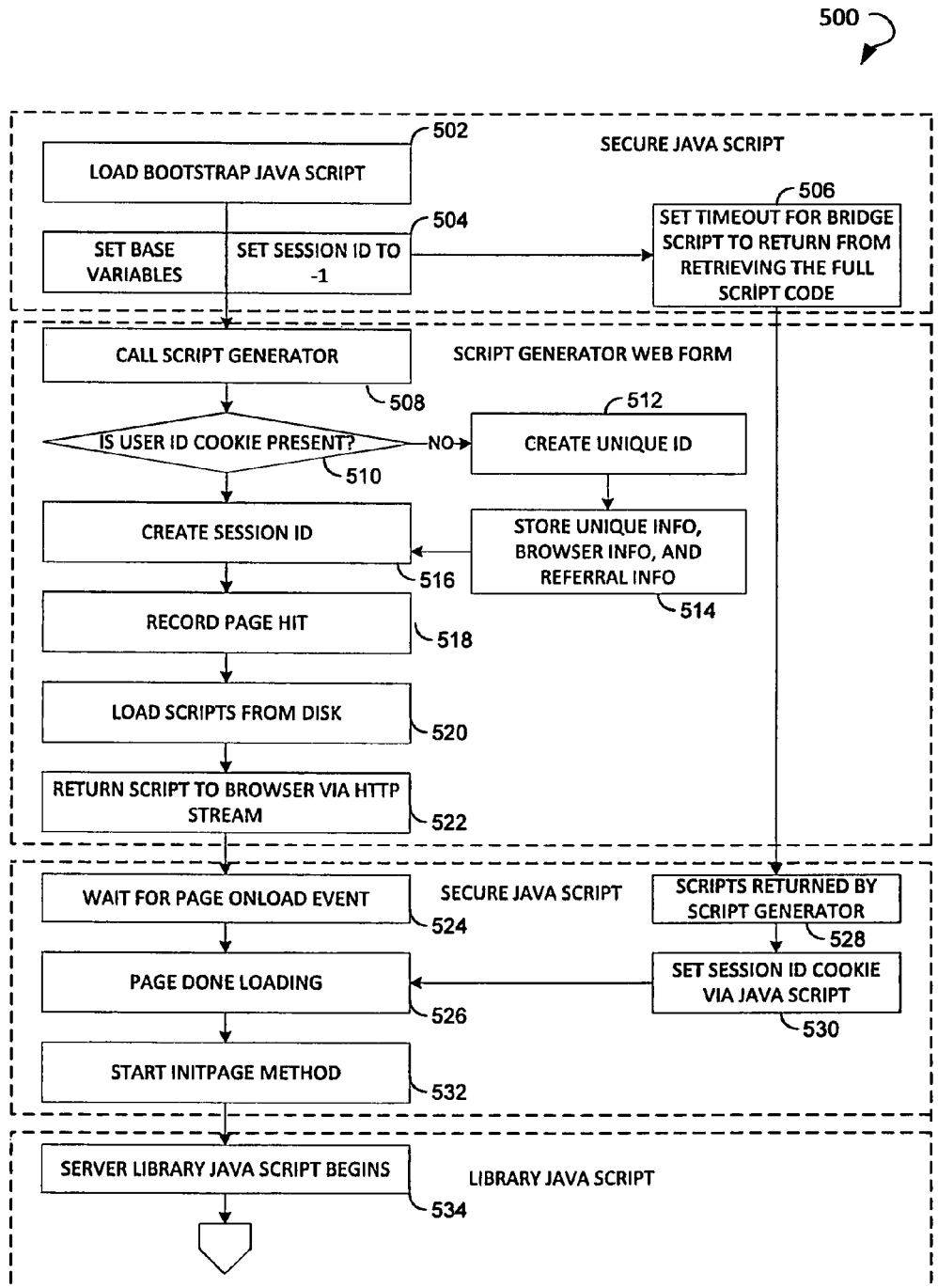
FIG. 5 is a process flow diagram illustrating the first part of a webpage load cycle of a user website, in accordance with an example embodiment.

FIG. 5 is a flow diagram illustrating the first part of a webpage load cycle 500, in accordance with an example embodiment. The load cycle of a user website can commence at operation 502 with loading a "bootstrap JavaScript". At operation 504, the script sets base variables and sets the session ID to a value equal −1. In some example embodiments, the webpage load cycle can simultaneously proceed to set time out for the bridge script to return from retrieving the full "library" script at operation 506 and to call the script generator at operation 508. Once the script generator 508 is called, it can be determined at operation 510 whether the user ID cookie is present. If it is determined that the user ID is present, then the load cycle proceeds to create a session ID at operation 516. If, on the other hand, it is determined that no user ID is present, the load cycle proceeds to create a unique ID at operation 512 and store the unique ID, browser data, and referral data at operation 514. Thereafter, a session ID is created at operation 516.

Once the session ID is created, the webpage load cycle proceeds to record a number of hits to the customer webpage 168 at operation 518, load script from the disk at operation 520, and return the script from the browser via an HTTP stream at operation 522. The webpage load cycle waits for an "on Load" event at operation 524. Once the "on Load" event is detected at 524 and the page is done loading at operation 526, an "initPage" method is initiated at operation 532. Thereafter, the pages load cycle 500 proceeds to load the server library script at operation 534.

Figure 6:
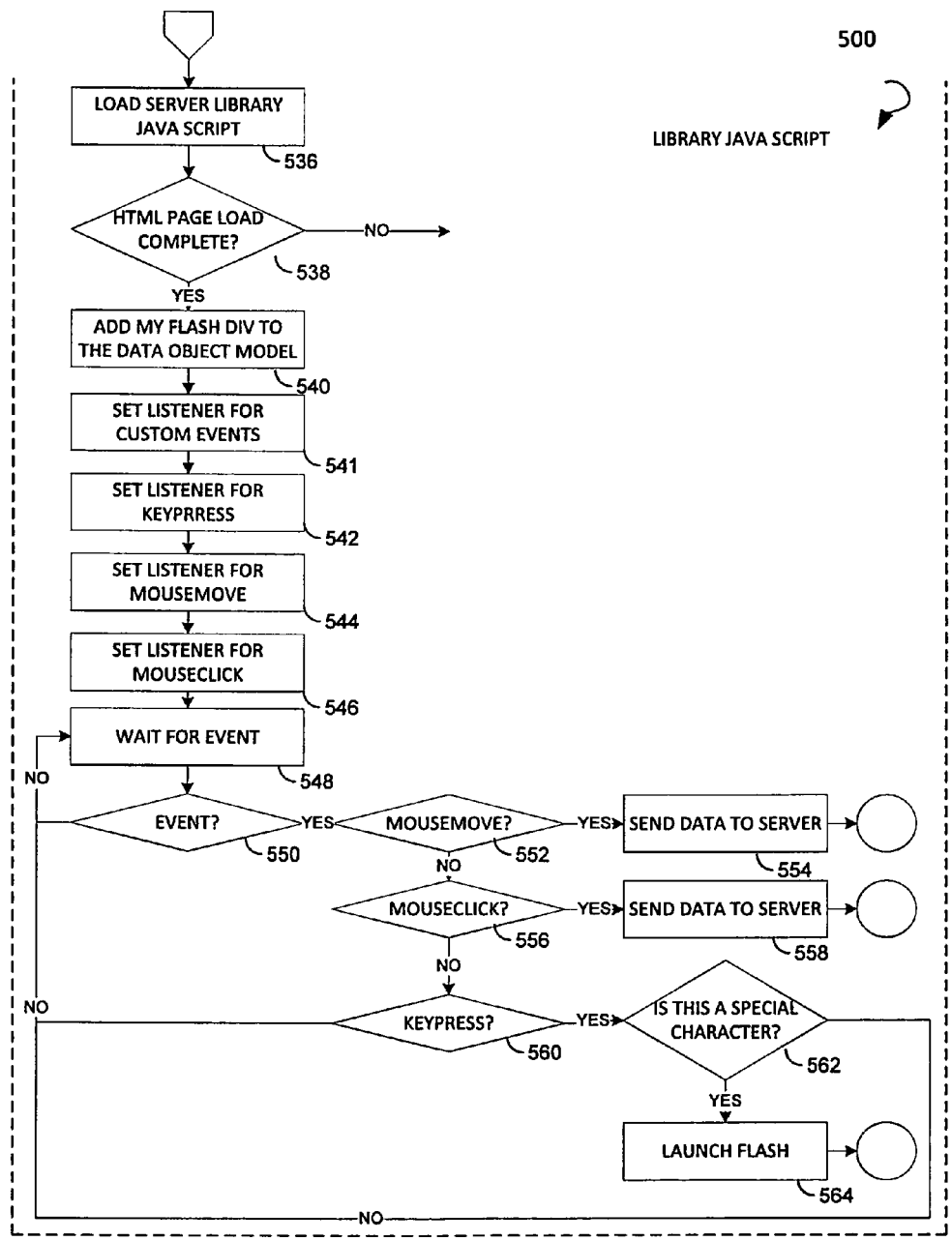
FIG. 6 is a process flow diagram illustrating the second part of a webpage load cycle of a user website, in accordance with an example embodiment.

FIG. 6 is a flow diagram illustrating the second part of the webpage load cycle of a user website, in accordance with an example embodiment. The page load cycle 500 continues to load server library JavaScript at operation 536. At operation 538, it can be determined whether the HTML page load is complete. If the HTML page load is complete, then the flowchart proceeds to add MY FLASH DIV to the DOM. In some example embodiments, the web browser does not have to use DOM in order to render an HTML document. However, the DOM may be required by JavaScript that wishes to inspect or modify the webpage dynamically. In other words, the DOM is the way JavaScript sees its containing HTML page and browser state. At operation 540, a listener is set to receive custom events, at operation 542, a listener is set to for keypress, at operation 544, a listener is set for mousemove, and at operation 546, a listener is set for mouseclick. Thereafter, the flowchart proceeds to operation 548 where it waits for event.

When an event is detected at operation 550, the process proceeds to operations 552, 556, and 560, in which the type of the detected event is determined. If the event is mousemove, the flowchart proceeds to operation 554. If the event is mouseclick, the flowchart proceeds to operation 558. If the event is keypress, the flowchart proceeds to operation 556. At operation 562, it is determined what character is being pressed. If the character being pressed is a special character (e.g., tilde), a flash application is launched at operation 564, the flash application being website analytics interface 162.

Figure 7:
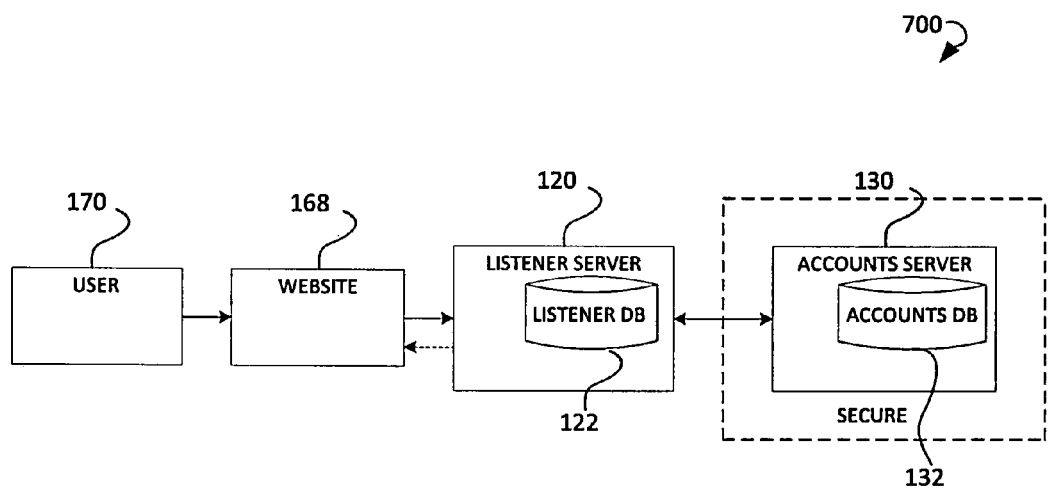
FIG. 7 is a block diagram illustrating a server configuration, in accordance with an example embodiment.
Figure 8:
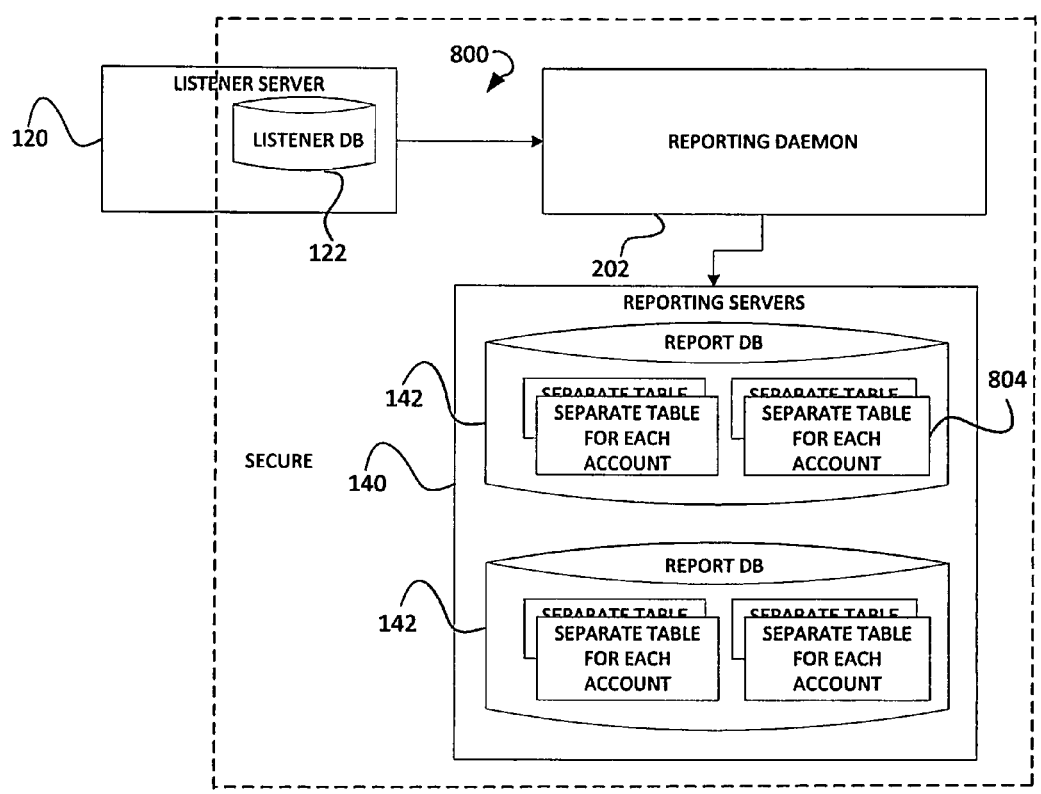
FIG. 8 is a block diagram illustrating website reporting, in accordance with an example embodiment.
Figure 9:
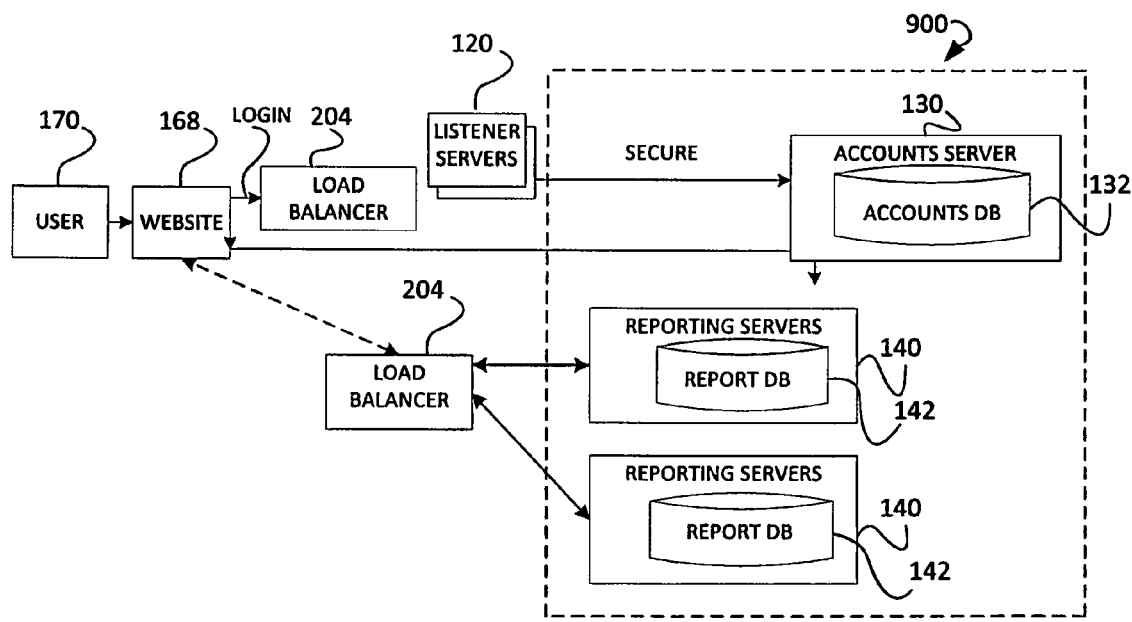
FIG. 9 is a block diagram illustrating further website reporting, in accordance with an example embodiment.
Figure 10:
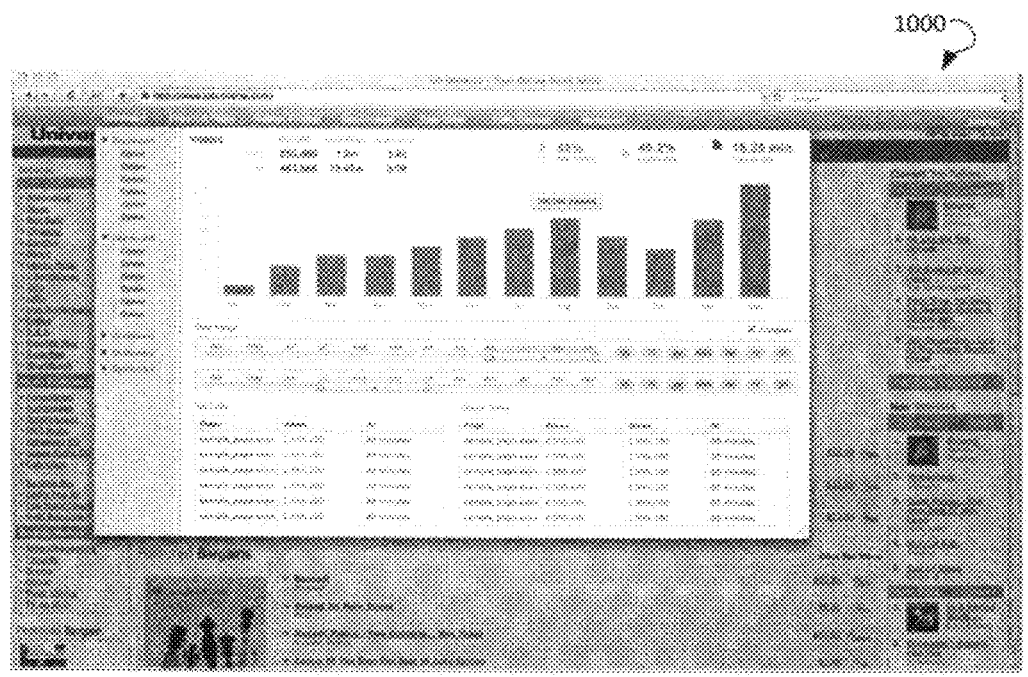
FIG. 10 is a block diagram illustrating a user interface in an open mode, in accordance with an example embodiment.
Figure 11:
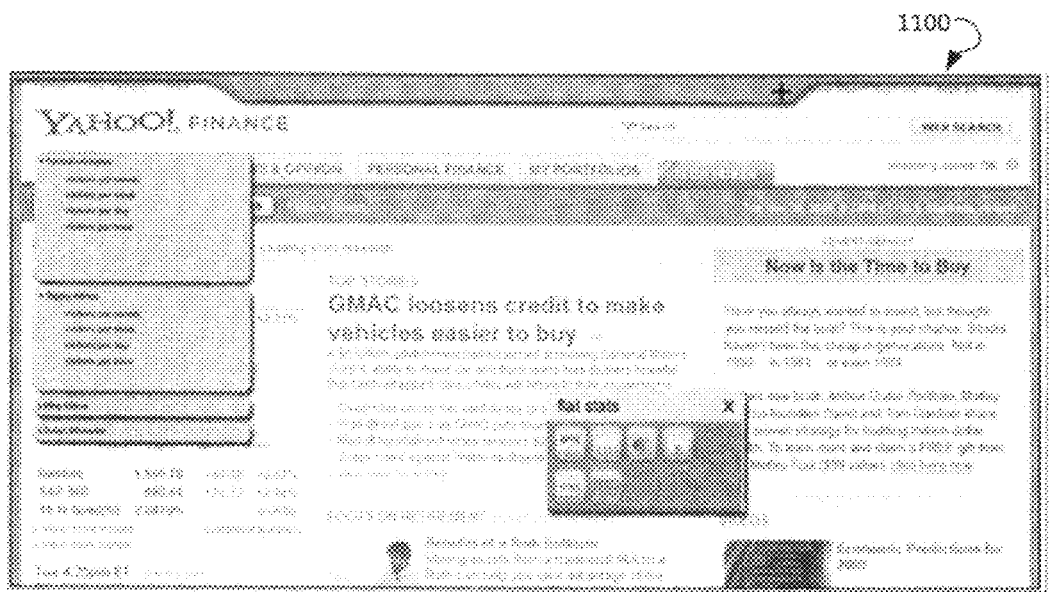
FIG. 11 is a block diagram illustrating a user interface in a minimized mode, in accordance with an example embodiment.

FIGS. 7, 8, and 9 are block diagrams illustrating a server configuration and website reporting, in accordance with example embodiments. Components of the server and their interactions are described above with reference to FIGS. 1, 2, 3, and 4. FIG. 8 is a block diagram illustrating website reporting, in accordance with an example embodiment. FIG. 9 is a block diagram illustrating further website reporting, in accordance with an example embodiment. FIG. 10 is a block diagram illustrating a user interface in an open mode, in accordance with an example embodiment. The interface can have two modes, open and minimized. The figure illustrates the interface in an open mode. FIG. 11 is a block diagram illustrating the user interface in minimized mode, in accordance with an example embodiment. The figure illustrates the interface in a minimized mode.

Figure 12:
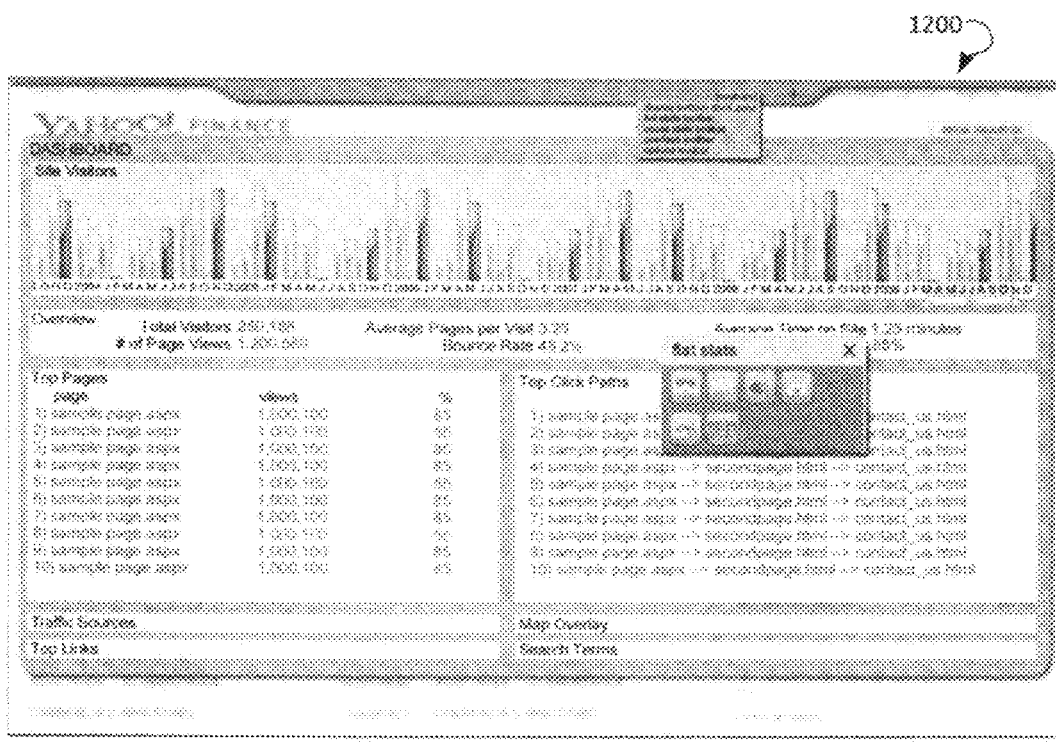
FIG. 12 is a block diagram illustrating a user interface in a minimized mode with the floating menus visible, in accordance with an example embodiment.
Figure 13:
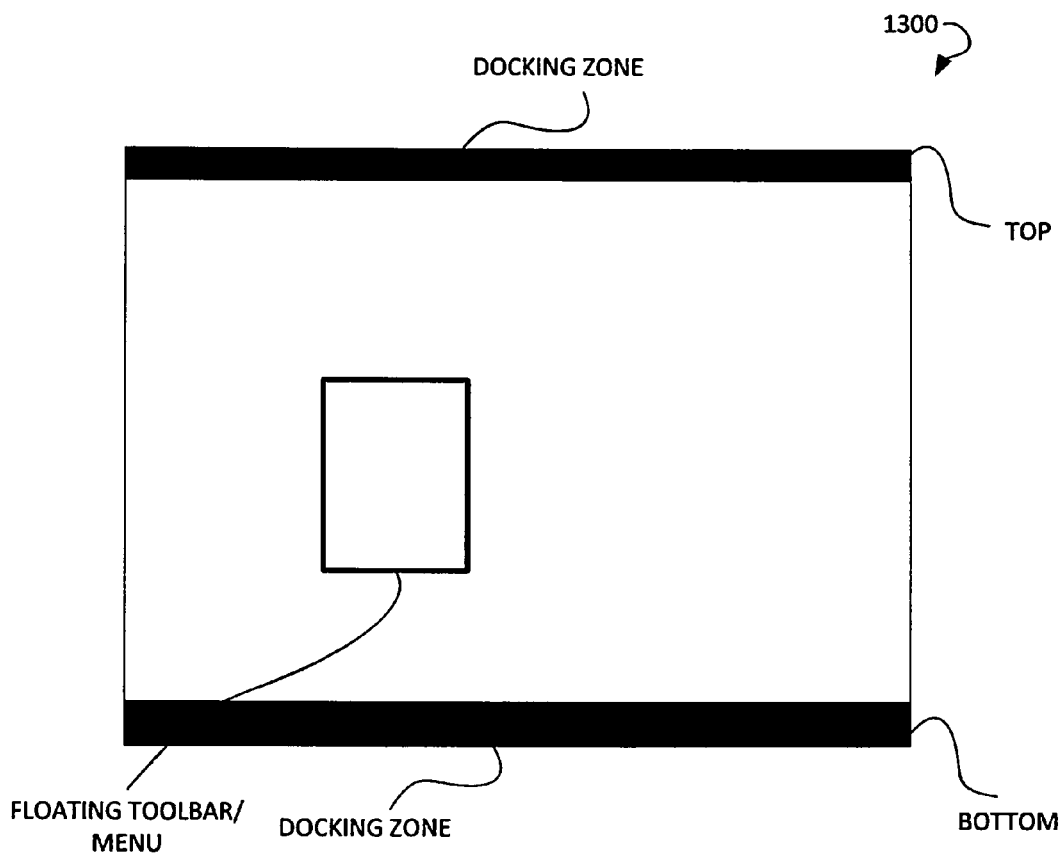
FIG. 13 is a block diagram illustrating functionalities of toolbars and menus of the user interface, in accordance with an example embodiment.
Figure 14:
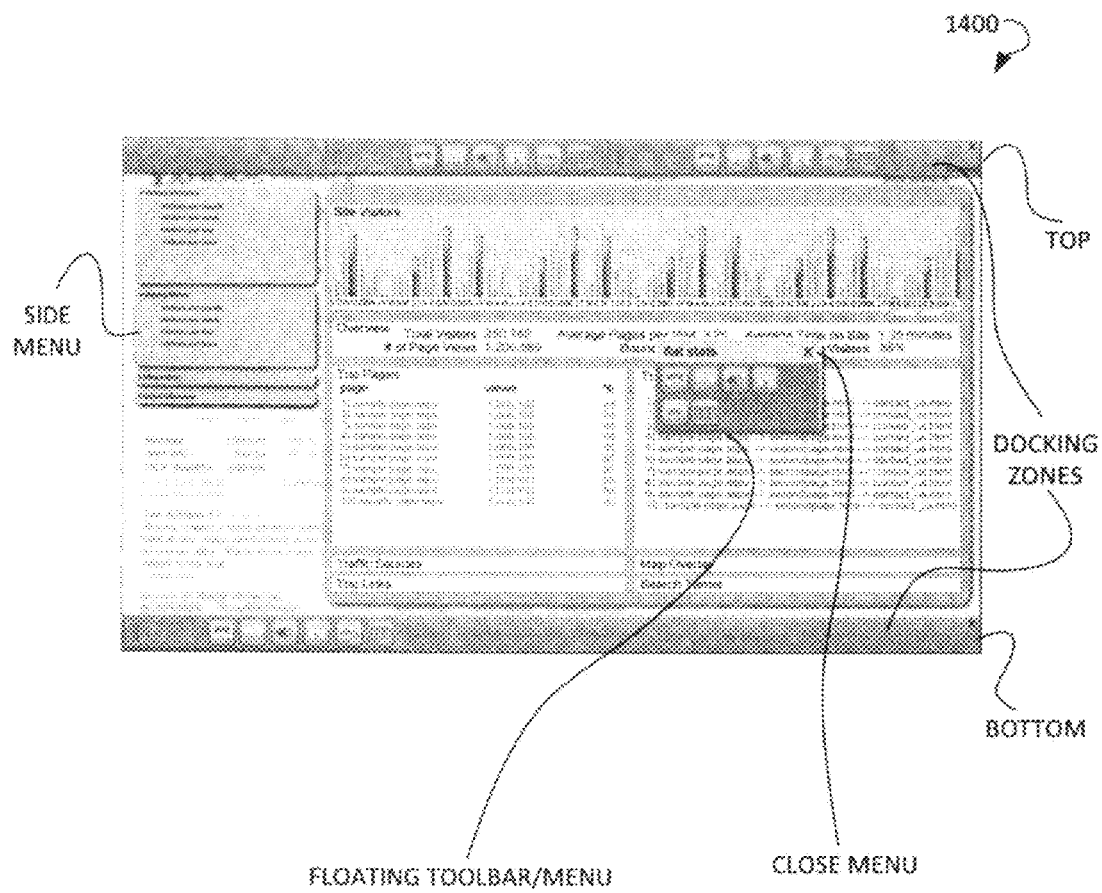
FIG. 14 is a block diagram illustrating further functionalities of the toolbars and menus of the user interface, in accordance with an example embodiment.

FIG. 12 is a block diagram illustrating the user interface in minimized mode with visible floating menus, in accordance with an example embodiment. When the interface is minimized, any floating menus are still visible as seen below. The toolbar link also lets users open and close all tool bars. FIG. 13 is a block diagram illustrating functionalities of toolbars and menus of the user interface, in accordance with an example embodiment. Toolbars and menus can be dragged around to the top docking zone, the bottom-docking zone, independent floating menus, and be completely closed. FIG. 14 is a block diagram illustrating further functionalities of toolbars and menus of the user interface, in accordance with an example embodiment. The interface may also be rollup up or rolled down, minimized and closed. Minimize rolls up the interface but leaves any floating menus and side menus visible. Close rolls up the interface and closes any floating menus and side menus.

Figure 15:
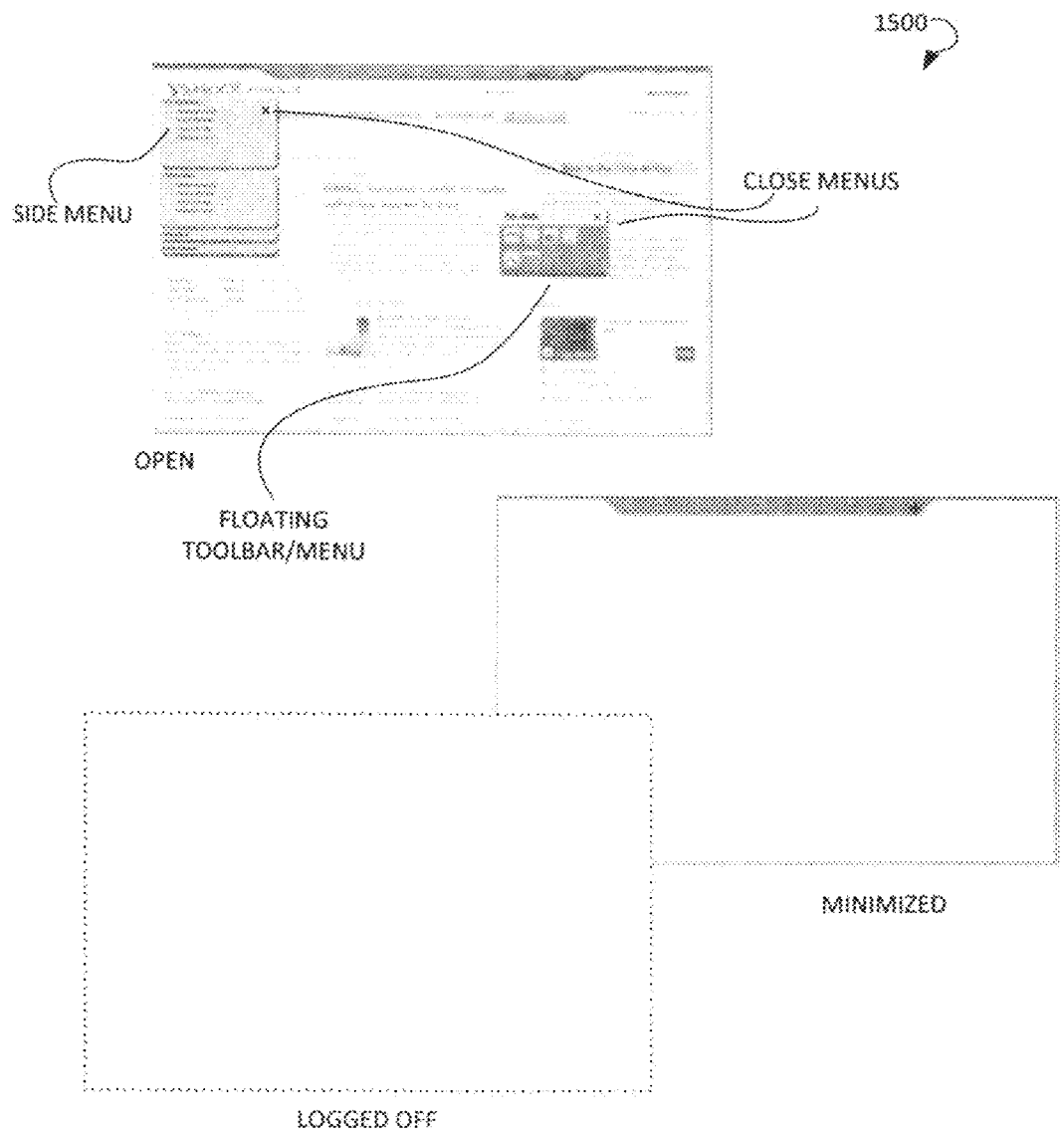
FIG. 15 is a block diagram illustrating toolbar functionalities of the user interface, in accordance with an example embodiment.
Figure 16:
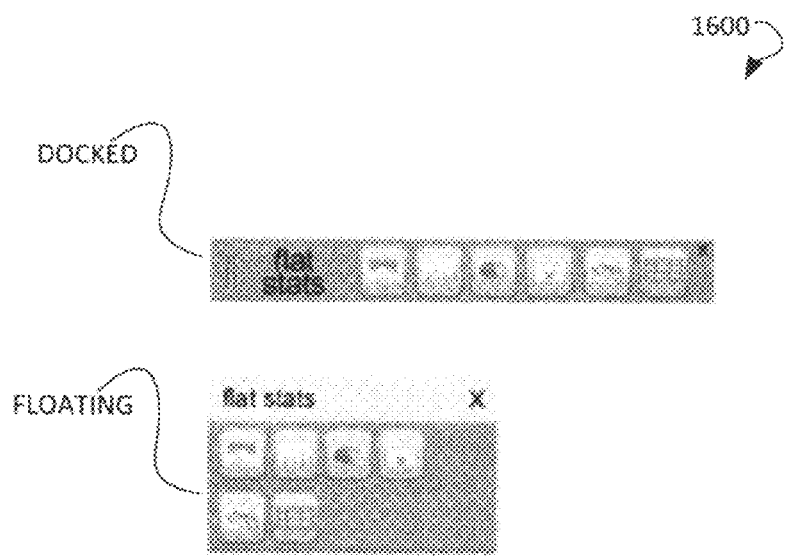
FIG. 16 is a block diagram illustrating toolbars of the user interface in docked and floating states, in accordance with an example embodiment.

FIG. 15 is a block diagram illustrating toolbar functionalities of the user interface, in accordance with an example embodiment. The figure illustrates expand and open/close other toolbars. Expand will open up the top and bottom menus and/or dock zones. Clicking the link can expand a menu to manually open or close any toolbar. FIG. 16 is a block diagram illustrating toolbars of the user interface in docked and floating states, in accordance with an example embodiment. There are four main tool bars. The toolbars can be docked, be floating or closed. Flat stats can show standard traffic and visitor information. Other elements can include pie charts, bar charts, line charts, funnels, data grids, visual stats—visitor usage information, entry/exit page thumbnails, visual click paths, multi-page heat map, overlays—information displayed over current site, entry/exit page thumbnails, heatmaps, top links (small set numbers), top links (large set push pins), options (e.g., account options, site setup, and site maps) The docked version and floating version of toolbars contain the same buttons. All aspects of the menus can be controlled via CSS and external image resources to allow for skinning.

Figure 17:
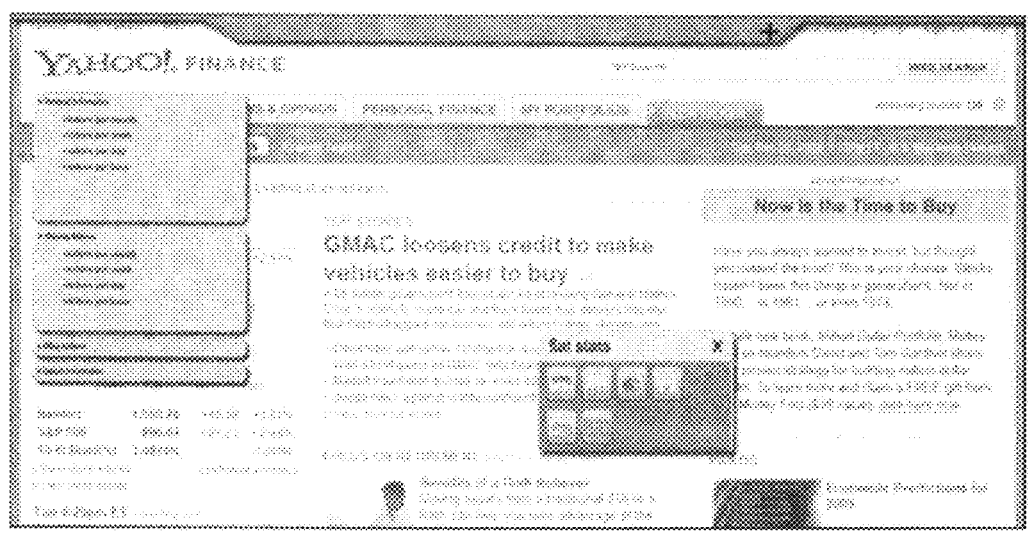
FIG. 17 is a block diagram illustrating side menus of the user interface, in accordance with an example embodiment.
Figure 18:
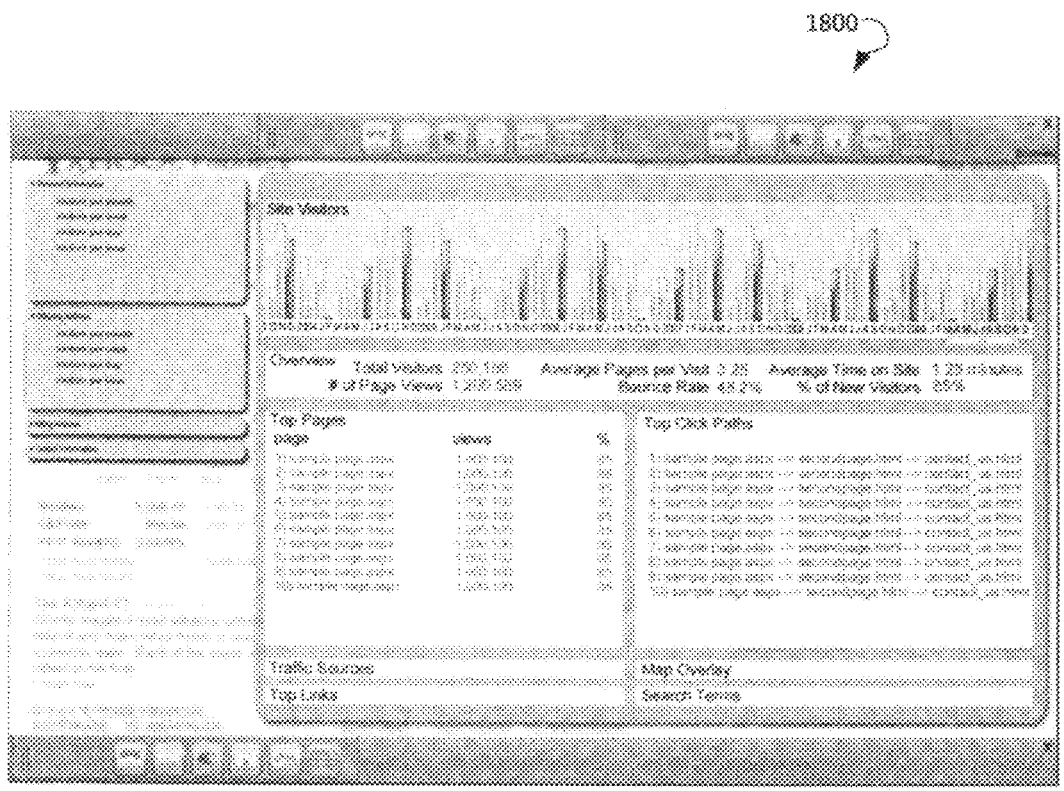
FIG. 18 is a block diagram illustrating further side menus of the user interface, in accordance with an example embodiment.

FIG. 17 is a block diagram illustrating side menus of the user interface, in accordance with an example embodiment. Some selected options have sub-menus, and features. These are displayed in a side menu that appears on the left side of the screen. This menu is an accordion style menu with collapsible layers. Selecting a toolbar option brings up the side menu. Selecting a sidebar item renders the information. FIG. 18 is a block diagram illustrating further side menus of the user interface, in accordance with an example embodiment. Information is displayed based on what is selected in the side menu. The floating menu has been closed to allow for better viewing of the data, but could be reopened at any time using the toolbars link.

Figure 19:
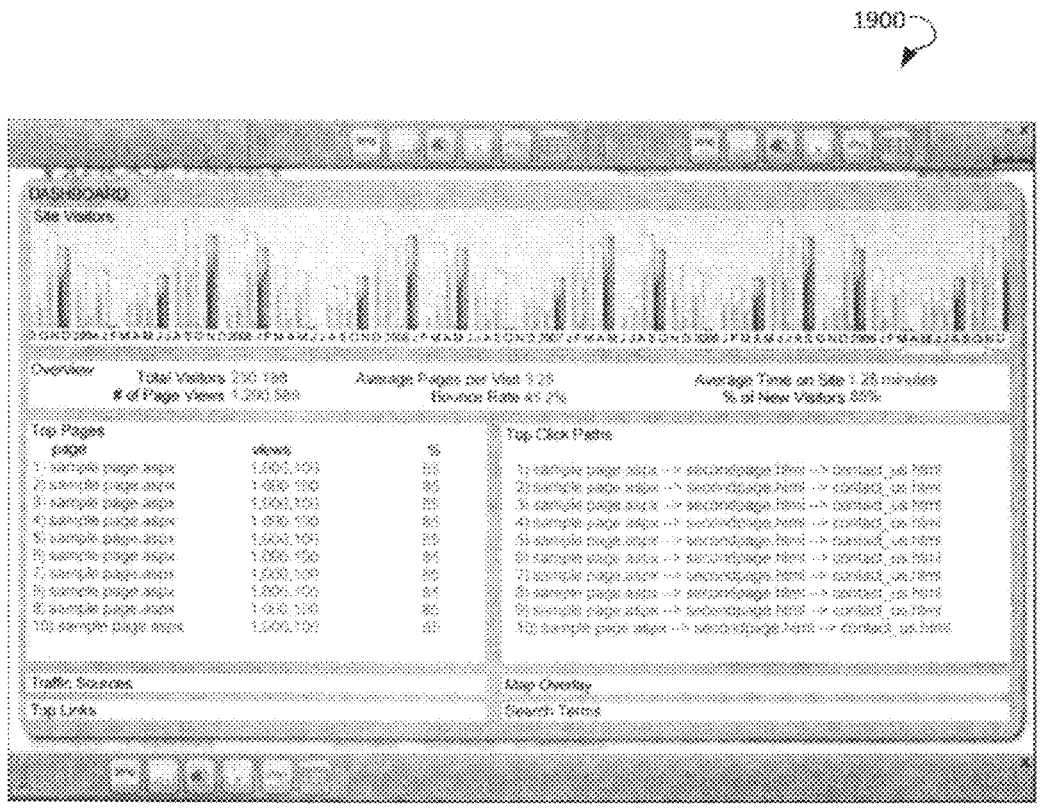
FIG. 19 is a block diagram illustrating a dashboard view of the user interface with top pages and top click paths expanded, in accordance with an example embodiment.
Figure 20:
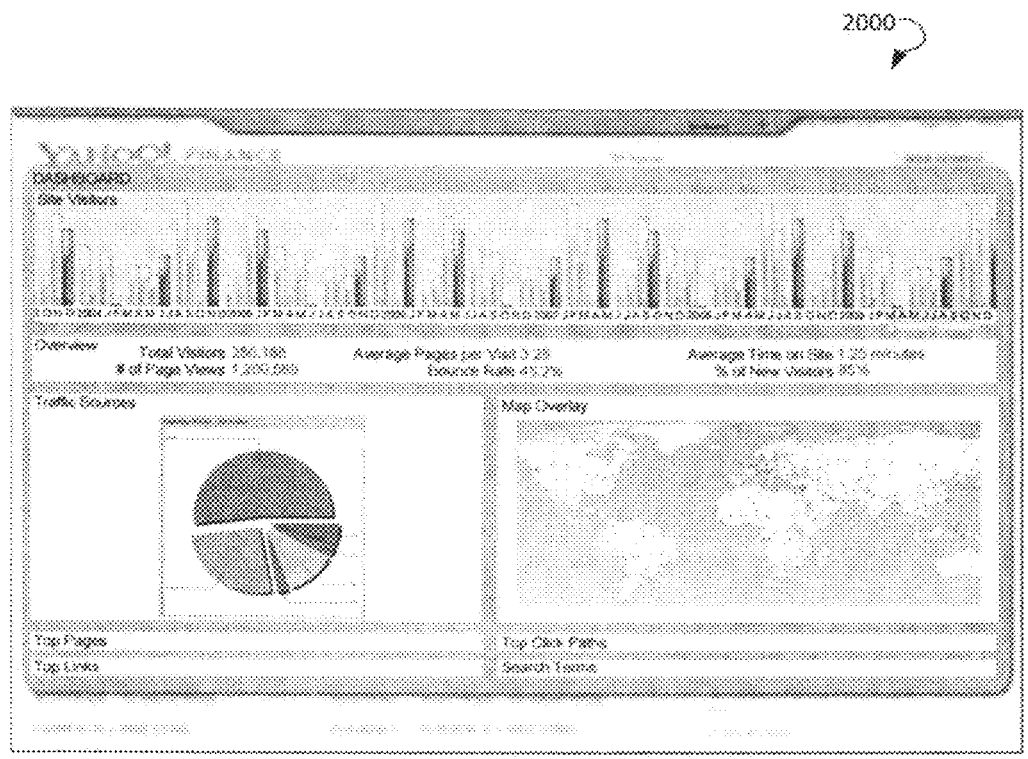
FIG. 20 is a block diagram illustrating a dashboard view of the user interface with traffic sources and map overlay expanded, in accordance with an example embodiment.

FIG. 19 is a block diagram illustrating a dashboard view of the user interface with top pages and top click paths expanded, in accordance with an example embodiment. When the website analytics first launches, the default screen is called the dashboard. This contains overview information of the entire site. A dashboard view is also available for each page. FIG. 20 is a block diagram illustrating a dashboard view of the user interface with traffic sources and map overlay expanded, in accordance with an example embodiment. The site visitors graph shows the number of visitors in a given time period (e.g., days, weeks, and months). The "overview" shows numerical top-level statistics for the entire site. Some of these stats are also available on individual pages.

Figure 21:
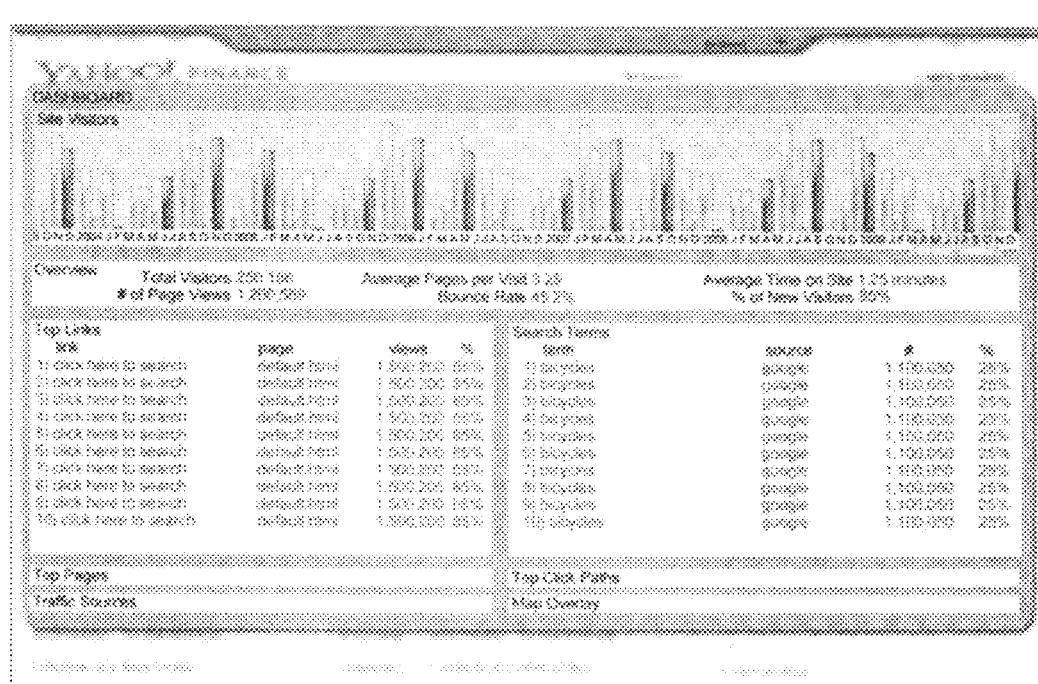
FIG. 21 is a block diagram illustrating a dashboard view of the user interface with top links and search terms expanded, in accordance with an example embodiment.

One of the interactive features of the dashboard is the six bottom components. At any time, two components can be expanded, when a third is expanded, one of the first two minimized. The top pages component lists the most visited pages, the number of views and the percentage of total views. The top click path displays the series of pages that are most popular. This is a text listing, but other features have graphic thumbnails of each page. FIG. 21 is a block diagram illustrating a dashboard view of the user interface with top links and search terms expanded, in accordance with an example embodiment. The site visitors' bar chart defaults to the current month, with a bar on each day of the month. A slider below the chart allows the user to select a different date range. The slider can be expanded to include a larger range, and moved along a time line. Other functionalities can include allowing comparison charts with multiple date ranges, drilling down capability (e.g., click on a day, and see the hours), changing chart type (e.g., bar, line, and curve) and geo-origination—global map overlay.

Figure 22:
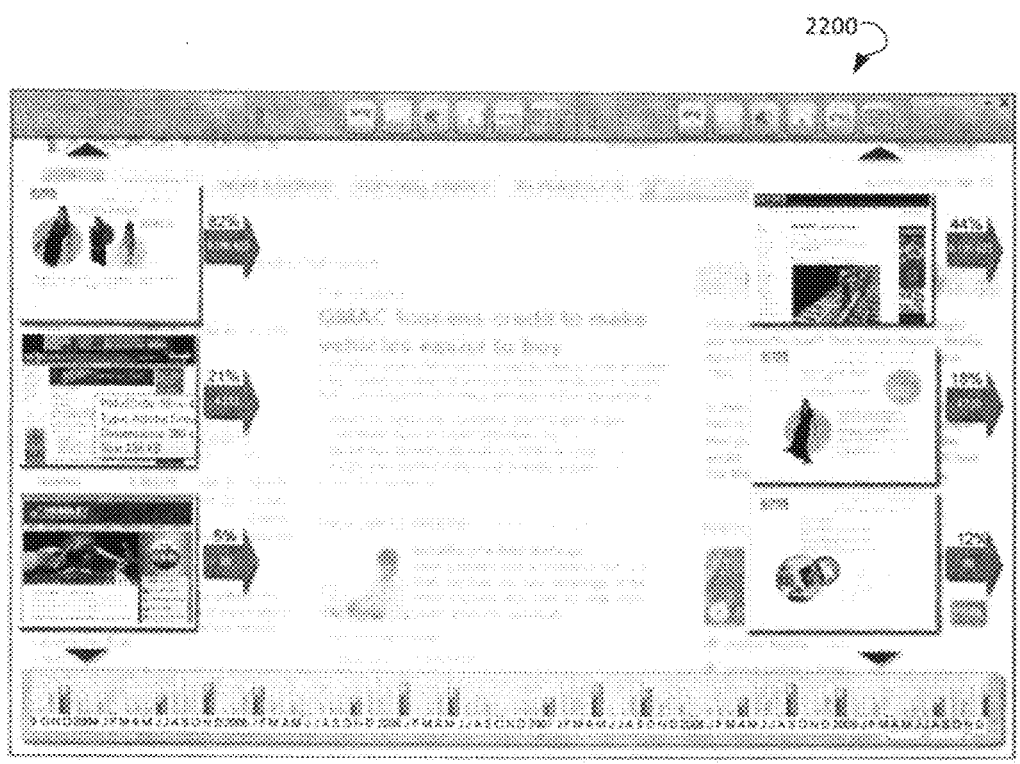
FIG. 22 is a block diagram illustrating thumbnails of web pages arranged in the order of the most frequent entry and exit of the website, in accordance with an example embodiment.

FIG. 22 is a block diagram illustrating thumbnails of web pages arranged in the order of most frequent entrance and exit of the website, in accordance with an example embodiment. This functionality is called entry and exit. It has two vertical lists of icons with data. Each list can be scrolled up or down independently from the other. The lists should scroll with a mouseClick on the red arrows. The movement can be immediate, smooth and then snap into place. It is not possible for an icon to appear half in place. Pressing and holding the mouse causes continuous movement.

Figure 23:
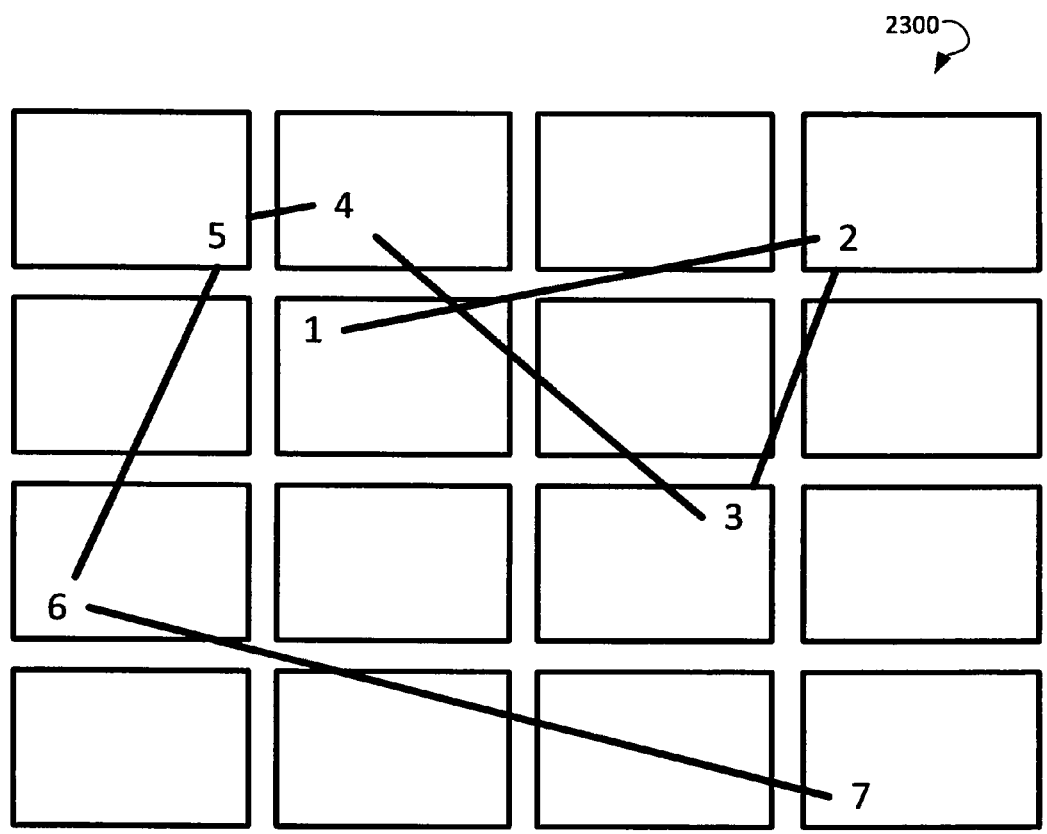
FIG. 23 is a block diagram illustrating the most frequent click path in a grid configuration of thumbnails, in accordance with an example embodiment.

FIG. 23 is a block diagram illustrating most frequent click path in a grid configuration of thumbnails, in accordance with an example embodiment. This is a tile control with X number of columns, and Y number of rows.

Figure 24:
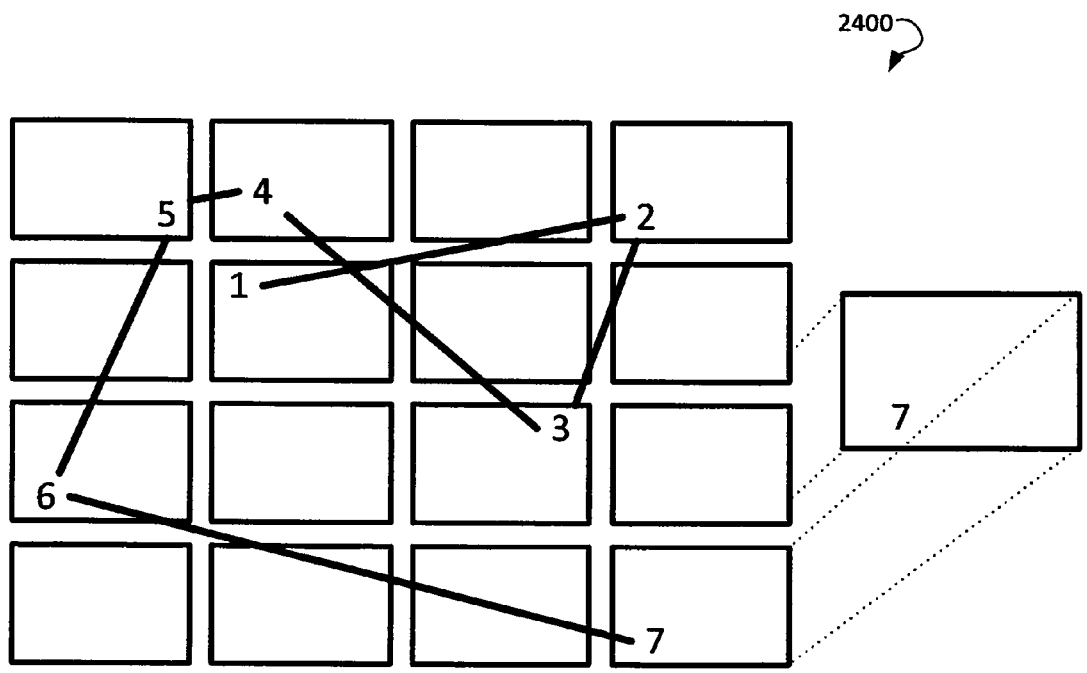
FIG. 24 is a block diagram illustrating the most frequent click path in a grid configuration of thumbnails with numbers ordering the thumbnails being placed in the places of most clicks for corresponding web pages, in accordance with an example embodiment.

FIG. 24 is a block diagram illustrating a most frequent click path in a grid configuration of thumbnails with numbers being placed in the places of most clicks, in accordance with an example embodiment.

Figure 25:
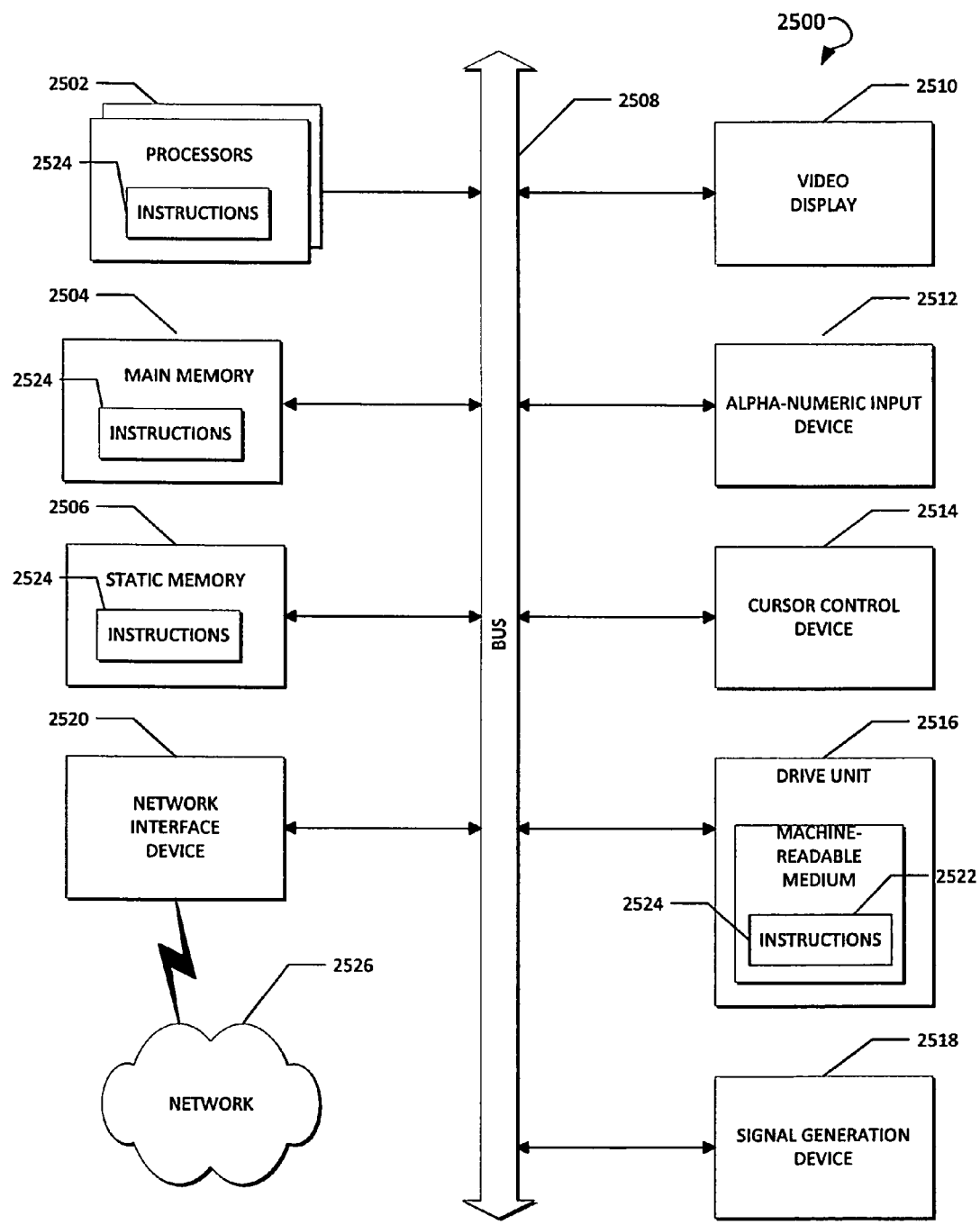
FIG. 25 is a diagrammatic representation of an example machine in the form of a computer system within which a set of instructions, for causing the machine to perform any one or more of the methodologies discussed herein, are executed.

FIG. 25 shows a diagrammatic representation of a computing device for a machine in the example electronic form of a computer system 2500, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes an engine or multiple engines 2502 (e.g., a central processing unit (CPU), a graphics processing unit (GPU), or both), and a main memory 2504 and a static memory 2506, which communicate with each other via a bus 2508. The computer system 2500 can further include a video display unit 2510 (e.g., a liquid crystal displays (LCD) or a cathode ray tube (CRT)). The computer system 2500 also includes an alphanumeric input device 2512 (e.g., a keyboard), a cursor control device 2525 (e.g., a mouse), a disk drive unit 2516, a signal generation device 2518 (e.g., a speaker) and a network interface device 2520.

The disk drive unit 2516 includes a computer-readable medium 2522 on which is stored one or more sets of instructions and data structures (e.g., instructions 2524) embodying or utilized by any one or more of the methodologies or functions described herein. The instructions 2524 can also reside, completely or at least partially, within the main memory 2504 and/or within the engines 2502 during execution thereof by the computer system 2500. The main memory 2504 and the engines 2502 also constitute machine-readable media.

The instructions 2524 can further be transmitted or received over a network 2526 via the network interface device 2520 utilizing any one of a number of well-known transfer protocols (e.g., Hyper Text Transfer Protocol (HTTP), CAN, Serial, Modbus).

While the computer-readable medium 2522 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, a method for visualizing of website analytics has been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What I claim is:

1. A computer-implemented method for visualization of website analytics, the method comprising:
receiving website usage data associated with a customer website indicating web pages are being loaded;
loading a first script into the web pages in response to determining the web pages are being loaded, wherein the first bootstrap script is configured to detect events occurring within the web pages during web sessions including key presses, mouse moves and mouse clicks, and collect and report the events as website usage data associated with the customer website;
generating website analytics from the website usage data associated with the customer website;
loading a second script into the web pages in response to receiving a request from a customer associated with the customer website, wherein the second script is configured to display the website analytics in overlays over the web pages;
sending the website analytics to the customer website via the second script and displaying the website analytics within a website analytics interface having one or more interactive graphical reports for the customer website;
identifying from the website analytics the web pages associated with a most frequent click path for the web sessions;
generating images associated with the web pages associated with the most frequent click path;
arranging the images in a grid with indicators depicting the most frequent click path; and
communicating the grid to the customer website.

2. The computer-implemented method of claim 1, wherein the first script dynamically changes content of the web pages by substituting original elements of a web page script with other elements, based on predetermined criteria stored remotely.

3. The computer-implemented method of claim 1, wherein the website analytics interface comprises a remote rich internet application enabling display of the one or more interactive graphical reports over the web pages of the customer website.

4. The computer-implemented method of claim 1, further comprising:
identifying most frequent access paths into the customer website during the different web sessions;
generating thumbnails representing the web pages of the customer website for the most frequent access paths into the customer website; and
displaying the thumbnails in an order based on the most frequent access paths into the customer website.

5. The computer-implemented method of claim 4, wherein the thumbnails are arranged linearly to represent a chronological order in which the customer website is most navigated.

6. The computer-implemented method of claim 4, further comprising displaying the thumbnails in an order corresponding to frequencies of entering and exiting of the customer website via the web pages, wherein the order is shown directly over the customer website as an overlay.

7. The computer-implemented method of claim 1, further comprising:
identifying a first set of the web pages of the customer website most frequently used for entering the customer website;
identifying a second set of the web pages of the customer website most frequently used for exiting the customer website;
displaying a first set of thumbnails associated with the first set of the web pages in an order based on how frequently the first set of the web pages are used for entering the customer website; and
displaying a second set of thumbnails associated with the second set of the web pages in an order based on how frequently the second set of the web pages are used for exiting the customer website.

8. The computer-implemented method of claim 1, wherein the one or more interactive graphical reports include a single or multi-page heat map, heat trail, or top links, using colors, shades, objects or other graphical representations to collectively illustrate and contrast frequency of movement over, scrolling of and usage of links, areas, and the web pages of the customer website with respect to each other.

9. A system comprising:
a listener server configured to receive website usage data associated with a customer website;
an analytics processor configured to:
aggregate the website usage data for different web sessions accessing web pages for the customer website, identify the web pages associated with a most frequent click path for the different web sessions,
generate thumbnails for the web pages associated with the most frequent click path, and
arrange the thumbnails in a grid connected with directional arrows depicting the most frequent click path, wherein each one of the directional arrows starts and ends at a location where an event has occurred; and
a reporting server configured to communicate the grid to the customer website.

10. The system of claim 9, wherein the reporting server is further configured to selectively communicate website analytics for the website usage data to the customer website, the website analytics being displayed within a website analytics interface having interactive graphical reports displayed over the web pages of the customer website.

11. The system of claim 10, wherein the interactive graphical reports are transparent, semitransparent, or opaque.

12. The system of claim 10, wherein the analytics processor is further configured to:
determine that the web pages for the customer website are being accessed;
deliver a first computer script; and
based on identification of a user as a customer associated with the customer website, selectively deliver a second computer script, wherein the second computer script enables selective delivery and display of the website analytics over the customer website.

13. The system of claim 12, wherein the first computer script is configured to selectively and dynamically change content within the web pages by substituting original elements of the web pages with other predetermined criteria.

14. The system of claim 10, wherein the listener server is configured to receive a request from a customer, and the reporting server is configured to deliver the website analytics interface to the customer website in response to the request.

15. The system of claim 9, wherein the analytics processor is further configured to display the thumbnails for the web pages in an order corresponding to how frequently the web pages are used for entering and exiting the customer website.

16. A computer program product for replaying an application session, the computer program product comprising a non-transitory computer readable storage medium having program code embodied wherewith, the program code readable/executable by a computer to perform a method comprising:
receiving website usage data associated with a customer website;
aggregating the website usage data for different web sessions accessing web pages for the customer website;
identifying the web pages associated with a most frequent click path for the different web sessions;
generating images associated with the web pages associated with the most frequent click path;
arranging the images in a grid connected with direction indicators depicting the most frequent click path; and
communicating the grid to the customer website.

17. The computer program product of claim 16, wherein the method further comprises generating website analytics from the website usage data as interactive graphical reports displayed over the web pages.

18. The computer program product of claim 17, wherein the method further comprises delivering a computer script to the customer website, wherein the computer script is configured to deliver and display the website analytics over the web pages and substitute original elements of the web pages with other elements configured to display the website analytics.

19. The computer program product of claim 16, wherein the method further comprises displaying the images associated with the web pages in an order corresponding to how frequently the web pages are used for entering and exiting the customer website.

* * * * *